(12) United States Patent
Maeda

(10) Patent No.: US 7,224,378 B2
(45) Date of Patent: May 29, 2007

(54) METHOD AND APPARATUS FOR OPTICAL RECORDING AND IMAGE FORMING CAPABLE OF CORRECTING A MAGNIFICATION ERROR IN SCANNING

(75) Inventor: Katsuhiko Maeda, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 330 days.

(21) Appl. No.: 10/762,265

(22) Filed: Jan. 23, 2004

(65) Prior Publication Data
US 2004/0160506 A1    Aug. 19, 2004

(30) Foreign Application Priority Data

| Jan. 23, 2003 | (JP) | ............................. 2003-015357 |
| Feb. 21, 2003 | (JP) | ............................. 2003-044912 |
| Mar. 11, 2003 | (JP) | ............................. 2003-065686 |
| Dec. 24, 2003 | (JP) | ............................. 2003-428226 |

(51) Int. Cl.
    *B41J 2/45* (2006.01)
    *B41J 2/47* (2006.01)
(52) U.S. Cl. ...................................... 347/235; 347/237
(58) Field of Classification Search ................ 347/132, 347/233, 235, 237
    See application file for complete search history.

(56) References Cited

U.S. PATENT DOCUMENTS 6,137,518 A    10/2000   Maeda 6,249,304 B1   6/2001   Sawayama et al.
6,292,206 B1   9/2001   Takehara et al.
6,906,739 B2 * 6/2005   Suzuki et al. ............... 347/233

FOREIGN PATENT DOCUMENTS

| JP | 2000-121971 | * 4/2000 |
| JP | 2000-355122 | 12/2000 |
| JP | 2001-066524 | 3/2001 |
| JP | 2001-150722 | 6/2001 |
| JP | 2001-341351 | 12/2001 |
| JP | 2002-029094 | 1/2002 |
| JP | 2002-036626 | 2/2002 |
| KR | 9-11538 | 1/1997 |
| KR | 2000-0067133 | 11/2000 |

\* cited by examiner

*Primary Examiner*—Huan Tran
(74) *Attorney, Agent, or Firm*—Oblon, Spivak, McClelland, Maier & Neustadt, P.C.

(57) ABSTRACT

An optical recording apparatus includes a light source, a scanner, and a phase shift controller. The light source emits a light beam controlled to be lit on and off in synchronism with a pixel clock signal according to input image data. The scanner reforms the light beam emitted by the light source into a cyclic scanning light beam scanning in a main scanning direction a photosensitive surface moving in a sub-scanning direction. The phase shift controller performs an image magnification correction by a phase change for changing a phase of the pixel clock signal in units of one nth of a cycle of the pixel clock signal at one or more positions on the photoconductive surface in the main scanning direction, in which n is an integer greater than one. A method and apparatus of optical image forming is also described.

48 Claims, 38 Drawing Sheets

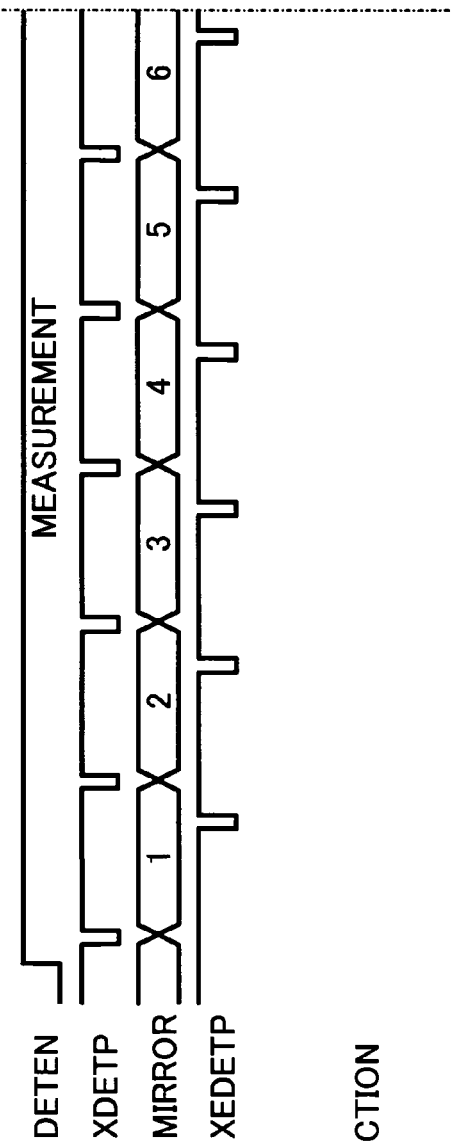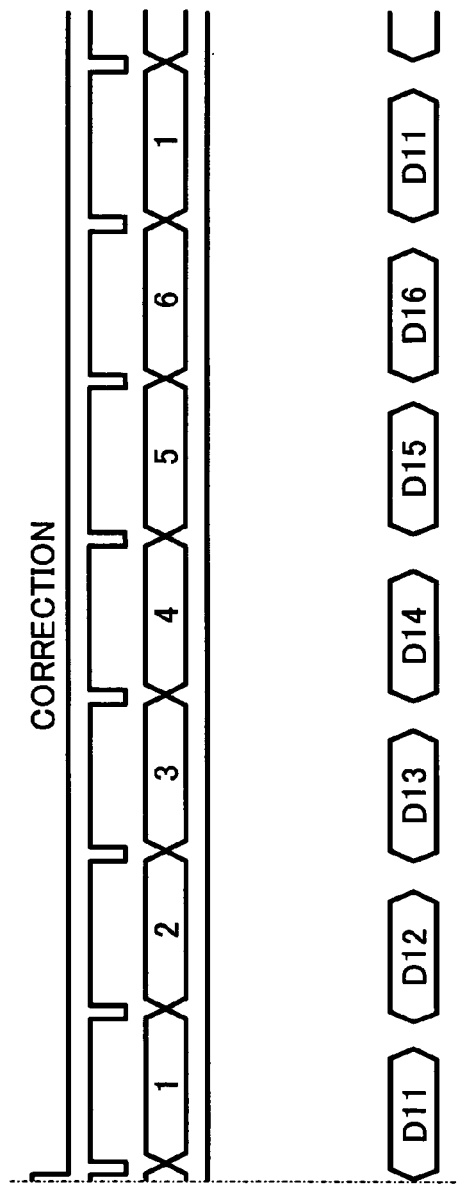
FIG. 12A
FIG. 12B

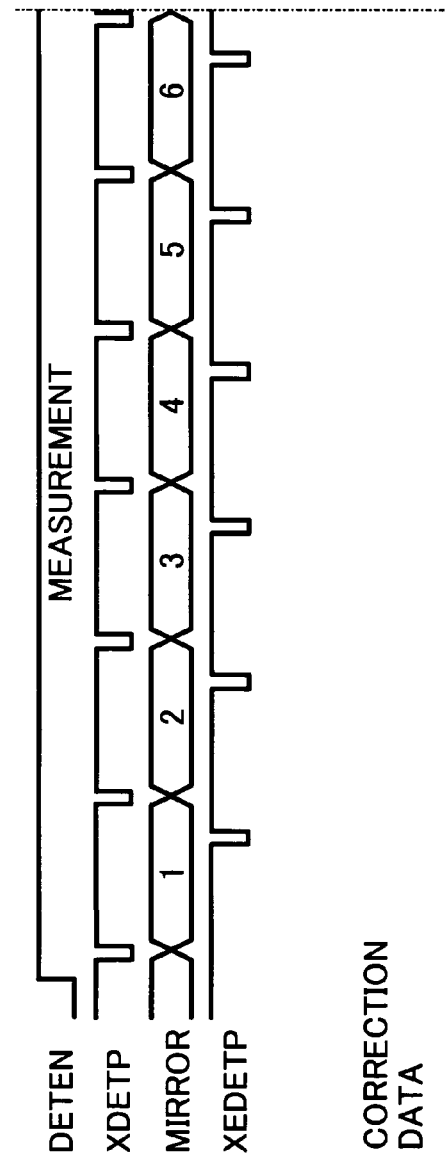
FIG. 18A
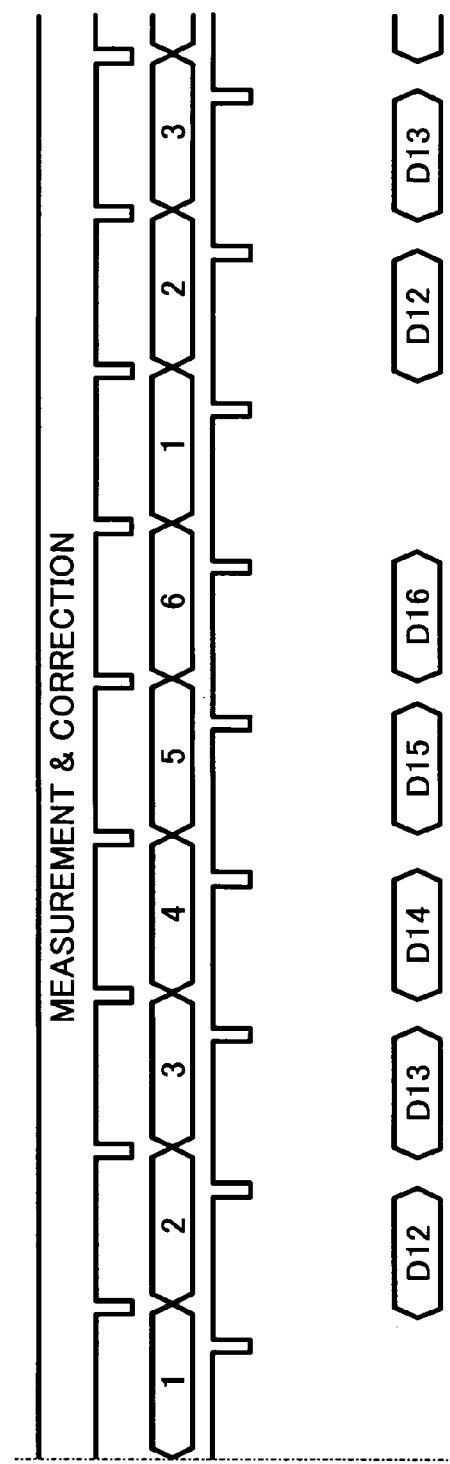
FIG. 18B
FIG. 18

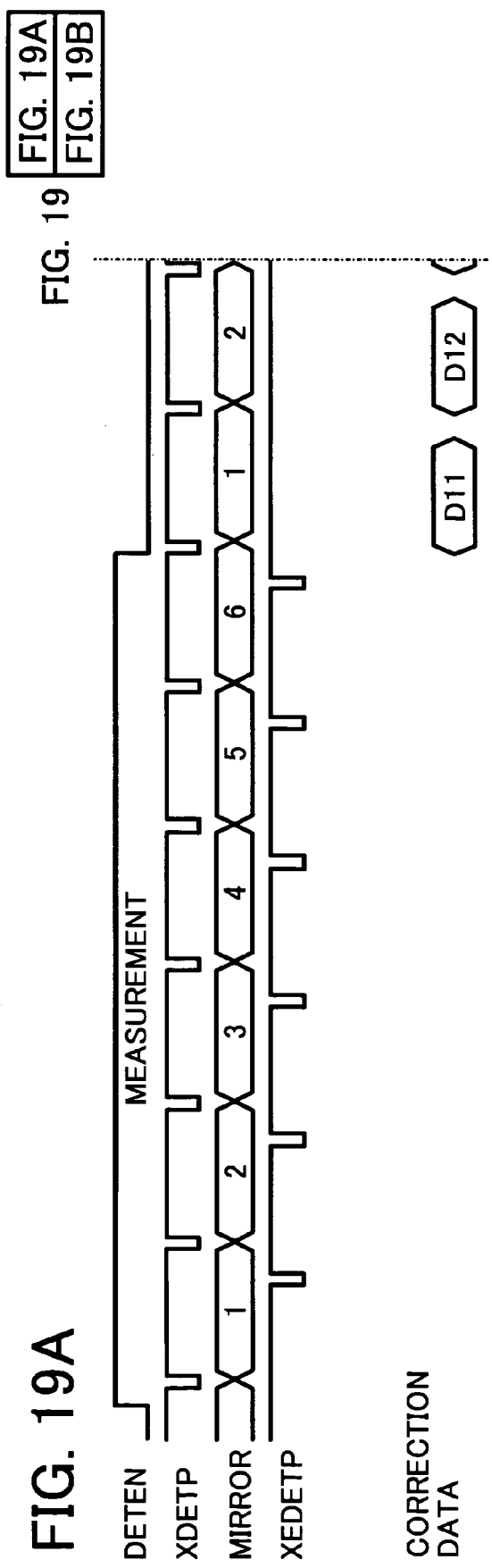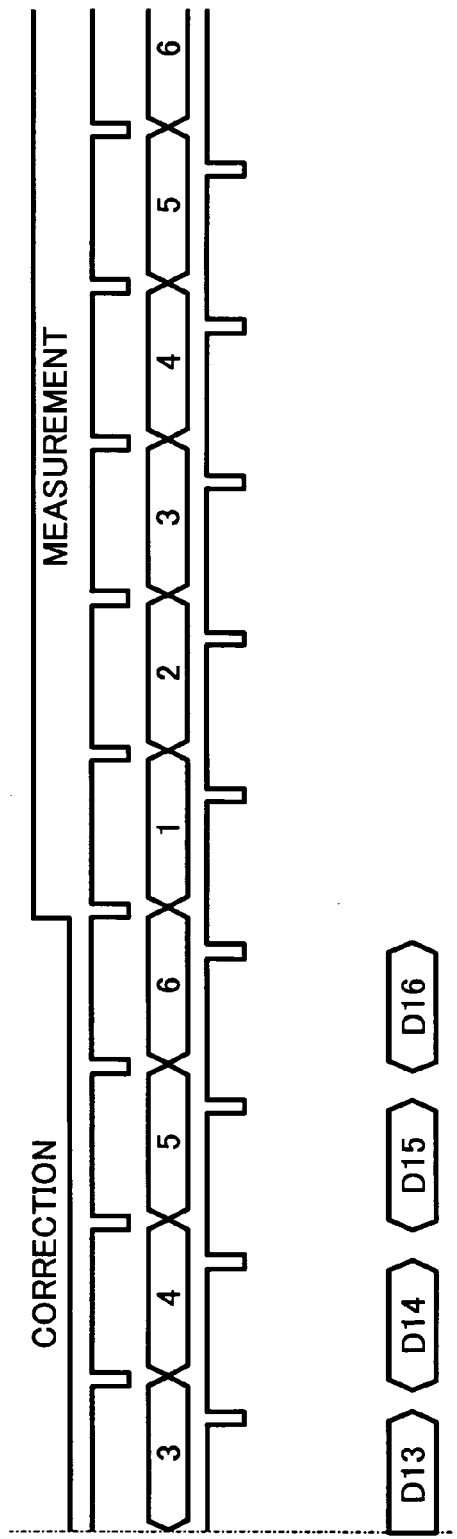
FIG. 19A
FIG. 19B
FIG. 19

METHOD AND APPARATUS FOR OPTICAL RECORDING AND IMAGE FORMING CAPABLE OF CORRECTING A MAGNIFICATION ERROR IN SCANNING

BACKGROUND OF THE INVENTION

1. Field of the Invention

The present invention relates to a method and apparatus for optical recording and image forming, and more particularly to a method and apparatus for optical recording and image forming capable of correcting a magnification error caused in a main scanning direction.

2. Discussion of the Background

In a background image forming apparatus using an optical scanning system, a typical process of image forming is conducted in a way such that a light beam is modulated and is reformed by a rotating deflecting member (e.g., a polygon mirror) into a scanning light beam which passes through an fθ lens and then impinges on an image carrying member (e.g., a photosensitive member). The scanning light beam deflected by the rotating deflecting member runs at a constant angular speed in a main scanning direction and is changed to the scanning light beam with a constant linear speed.

The background image forming apparatus, however, has a drawback in which an accuracy of an image magnification in a scanning line differs between apparatuses due to characteristics of optical components such as lenses used therein. Plastic lenses, in particular, are mostly susceptible to variations in environmental temperature and are easily deformed, resulting in a change in refractive index. This may cause a change in a scanning position of an image plane on a photosensitive member and accordingly an error of an image magnification in the main scanning direction. As a result, a high quality image is failed. The failure may become more serious in a color image forming apparatus which handles a plurality of different color images with using a plurality of laser beams and a plurality of lens systems. That is, the plurality of different color images may have errors independently which cause a typical color image problem called a color deviation. Therefore, the image magnifications of the different color images need to match with each other as much as possible.

SUMMARY OF THE INVENTION

In view of the foregoing, it is an object of the present invention to provide a novel optical recording apparatus which corrects an error of an image magnification in a main scanning direction.

Another object of the present invention to provide a novel optical image forming apparatus which corrects an error of an image magnification in a main scanning direction.

Another object of the present invention is to provide a novel optical image forming method which corrects an error of an image magnification in a main scanning direction.

To achieve the above and other objects, in one example, a novel optical recording apparatus includes a light source, a scanning mechanism, and a phase shift controlling mechanism. The light source emits a light beam. The scanning mechanism is configured to reform the light beam emitted by the light source into a cyclic scanning light beam which scans in a main scanning direction a photosensitive surface moving in a sub-scanning direction. The phase shift controlling mechanism is configured to perform an image magnification correction by a phase change for changing a phase of pixel clock signal in units of one nth of a cycle of the pixel clock signal at one or more positions on the photoconductive surface in the main scanning direction, in which n is an integer greater than one. The above-mentioned pixel clock signals are used for a control of the light source to turn the light on and off in accordance with image data.

The above-mentioned optical recording apparatus may further include a detecting mechanism and a time measuring mechanism. The detecting mechanism is configured to detect the cyclic scanning light beam reformed by the scanning mechanism at two detecting positions on the photosensitive surface. The time measuring mechanism is configured to measure a time difference between two detection times the detecting mechanism detects the cyclic scanning light beams at the two detecting positions. With this structure, the phase shift controlling mechanism performs the image magnification correction based on the time difference measured by the time measuring mechanism.

Another novel optical recording apparatus for use in a color image forming apparatus, in one example, includes a light source, a scanning mechanism, and a phase shift controlling mechanism. The light source sequentially emits a plurality of light beams corresponding to basic color elements of a full color image. The scanning mechanism is configured to independently reform the plurality of light beams emitted by the light source into respective cyclic scanning light beams to sequentially scan in a main scanning direction a photosensitive surface moving in a sub-scanning direction. The phase shift controlling mechanism is configured to perform an image magnification correction by a phase change for changing a phase of pixel clock signal in units of one nth of a cycle of the pixel clock signal at one or more positions on the photoconductive surface in the main scanning direction, in which n is an integer greater than one. The pixel clock signals are used for a control of the light source to turn on and off each of the cyclic scanning light beams in accordance with each of the basic color elements of the full color image.

The phase shift controlling mechanism may perform the image magnification correction based on a signal representing an image deviation in the main scanning direction transmitted from the image forming apparatus.

The above-mentioned optical recording apparatus may further include a detecting mechanism and a time measuring mechanism. The detecting mechanism is configured to perform a beam detection for independently detecting the respective cyclic scanning light beams, which were reformed into by the scanning mechanism, at two detecting positions on the photosensitive surface. The time measuring mechanism is configured to perform a time measurement for each of the respective cyclic scanning light beams by measuring a time difference between detection results at the two detecting positions by the detecting mechanism. With this structure, the phase shift controlling mechanism performs the image magnification correction based on the time difference measured by the time measuring mechanism.

The phase shift controlling mechanism may perform the image magnification correction based on the time difference measured by the time measuring mechanism and a signal representing an image deviation in the main scanning direction transmitted from the image forming apparatus.

The above-mentioned optical recording apparatus may further include a pixel clock frequency controlling mechanism Which is configured to change a frequency of the pixel clock signals in steps of a predetermined frequency value to perform the image magnification correction in collaboration with the phase shift controlling mechanism.

The phase shift controlling mechanism may perform a portion of the image magnification correction smaller than the predetermined frequency value.

The scanning mechanism may include at least one light deflecting mechanism. Each one of the at least one light deflecting mechanism includes a plurality of light deflecting surfaces configured to move and to deflect each one of the plurality of light beams emitted by the light source to reform it into corresponding one of the respective cyclic scanning light beams. The detecting mechanism may perform the beam detection per each of the plurality of light deflecting surfaces and the time measuring mechanism performs the time measurement per each of the plurality of light deflecting surfaces. The phase shift controlling mechanism may perform the image magnification correction based on the time measurement performed per each of the plurality of light deflecting surfaces by the time measuring mechanism.

The beam detection by the detecting mechanism and the time measurement by the time measuring mechanism may be carried out when the plurality of light deflecting surfaces is restarted after being stopped from moving or changed to move at a different moving rate.

The beam detection by the detecting mechanism and the time measurement by the time measuring mechanism may be carried out when the light source is again activated after being inactivated and emitting no light beam.

In the above-mentioned novel optical recording apparatus, a time measurement on a specific light deflecting surface out of the plurality of light deflecting surfaces performed by the time measuring mechanism may be regarded as a reference time measurement and the phase shift controlling mechanism may perform the image magnification correction with respect to each one of other light deflecting surfaces than the specific light deflecting surface out of the plurality of light deflecting surfaces based on a difference of a corresponding time measurement from the reference time measurement.

The time measurement and the image magnification correction may be performed in a cyclic manner by the time measuring mechanism and the phase shift controlling mechanism, respectively, during an image forming process when the plurality of light deflecting surfaces are moving in a steady state to emit the plurality of light beams.

In the above-mentioned novel optical recording apparatus, a cycle of the time measurement performed by the time measuring mechanism may be changeable.

In the above-mentioned novel optical recording apparatus, one of the two detecting positions for the detecting mechanism may be located close to a starting edge of an effective image area and a different one of the two detecting positions may be located close to an ending edge of the two ends of the effective image area.

To achieve the above and other objects, in one example, a novel image forming apparatus include a photosensitive member, an optical recorder, and an image forming controller. The photosensitive member has a photosensitive surface movable in a sub-scanning direction. The optical recorder includes a light source, a scanner, a phase shift controller. The light source emits a light beam. The scanner is configured to reform the light beam emitted by the light source into a cyclic scanning light beam which scans in a main scanning direction the photosensitive surface moving in the sub-scanning direction. The phase shift controller is configured to perform an image magnification correction by a phase change for changing a phase of pixel clock signal in units of one nth of a cycle of the pixel clock signal at one or more positions on the photoconductive surface in the main scanning direction, in which n is an integer greater than one. The pixel clock signals are used for a control of the light source to turn the light on and off in accordance with image data. The image forming controller is configured to determine the positions, at which the phase change is performed by the phase shift controller, randomly or evenly within an effective image area.

To achieve the above and other objects, in one example, a novel optical recording method includes the steps of generating, emitting, reforming, and performing. The generating step generates a pixel clock signal. The emitting step emits a light beam in accordance with image data in steps of pixel clock signal. The reforming step reforms the light beam into a cyclic scanning light beam, which scans in a main scanning direction a photosensitive surface moving in a sub-scanning direction. The performing step performs an image magnification correction by a phase change for changing a phase of pixel clock signal in units of one nth of a cycle of the pixel clock signal at one or more positions on the photoconductive surface in the main scanning direction, in which n is an integer greater than one.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12 is a time chart for explaining relationships among signals of DETEN, XDETP, a mirror number, XEDETP, and correction data;

FIG. 18 is a time chart for explaining an exemplary procedure of another image magnification correction in which measurement and correction are repeatedly conducted in parallel until a signal DETEN is turned off;

FIG. 19 is a time chart for explaining an exemplary procedure of another image magnification correction in which measurement and correction are alternately conducted;

DETAILED DESCRIPTION OF PREFERRED EMBODIMENTS

Figure 1:
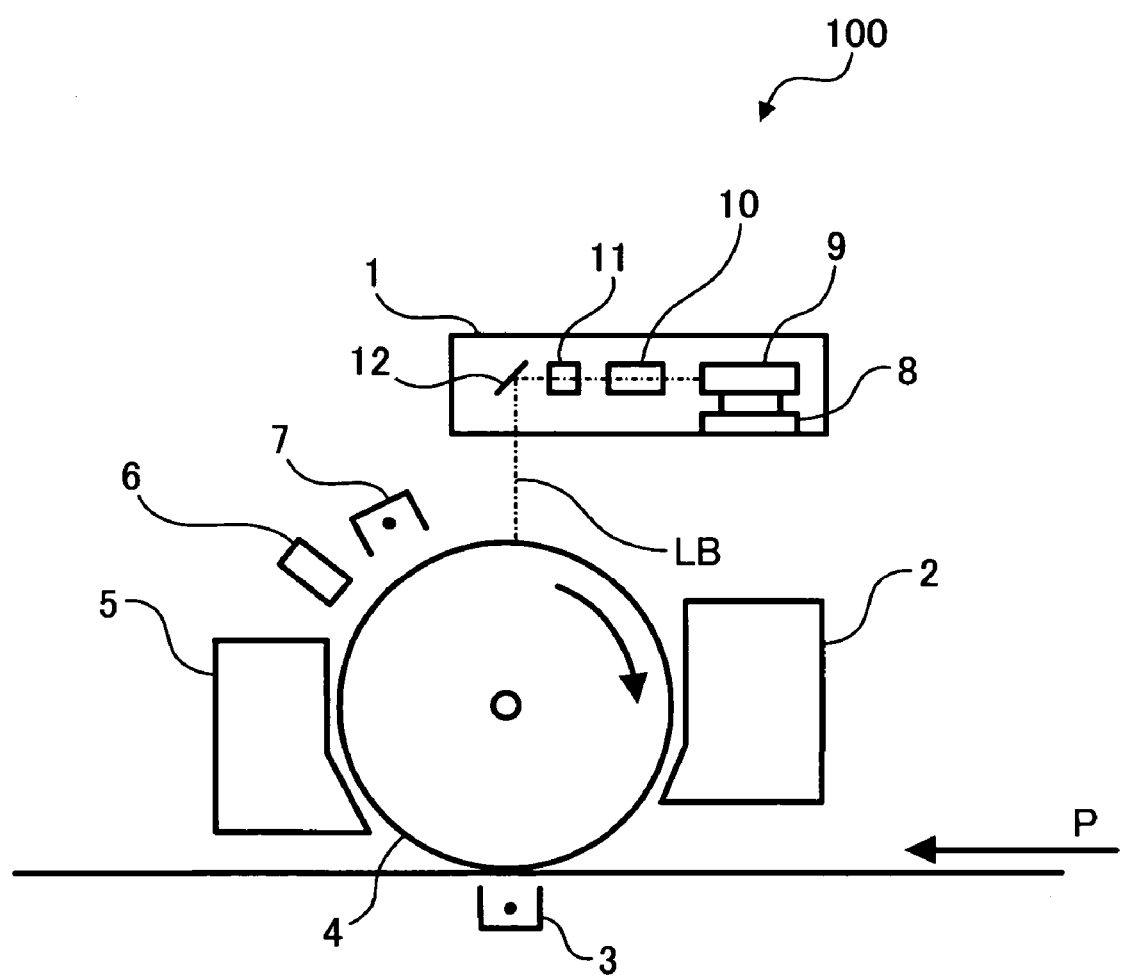
FIG. 1 is a schematic diagram of an image forming apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, an image forming apparatus 100 according to an exemplary embodiment of the present invention is explained. The image forming apparatus 100 illustrated in FIG. 1 is a single-drum black-and-white copying machine and applies an electrophotographic process including charging, exposing, developing, transferring, and fixing processes, known per se. Such image forming apparatus 100 includes key components for the electrophotographic process including an optical scanning unit 1, a development unit 2, an image transfer unit 3, a photosensitive drum 4, a cleaning unit 5, a discharging unit 6, and a charging unit 7. As illustrated in FIG. 1, the photosensitive drum 4 is arranged at the center of these components.

The optical scanning unit 1 includes a polygon motor 8, a polygon mirror 9, an fθ lens 10, a BTL (barrel troidal lens) 11, and a mirror 12. The optical scanning unit 1 generates a light beam LB altering between on and off states according to image data. The light beam LB is collimated by a collimate lens (not shown), passes through a cylinder lens (not shown), and impinges on the polygon mirror 9 rotated by the polygon motor 8. Each mirror surface of the rotating polygon mirror 9 continuously deflects the light beam LB so that the light beam LB becomes a scanning beam sweeping in a main scanning direction. The scanning light beam LB passes through the fθ lens 10 and the BTL lens 11, and is deflected by the mirror 12 towards the photosensitive drum 4. The BTL lens 11 adjusts the focus of the scanning light beam LB in a sub-scanning direction. More specifically, the BTL lens 11 gathers light and corrects for an improper position of light such as an image surface tipping in the sub-scanning direction.

Figure 2:
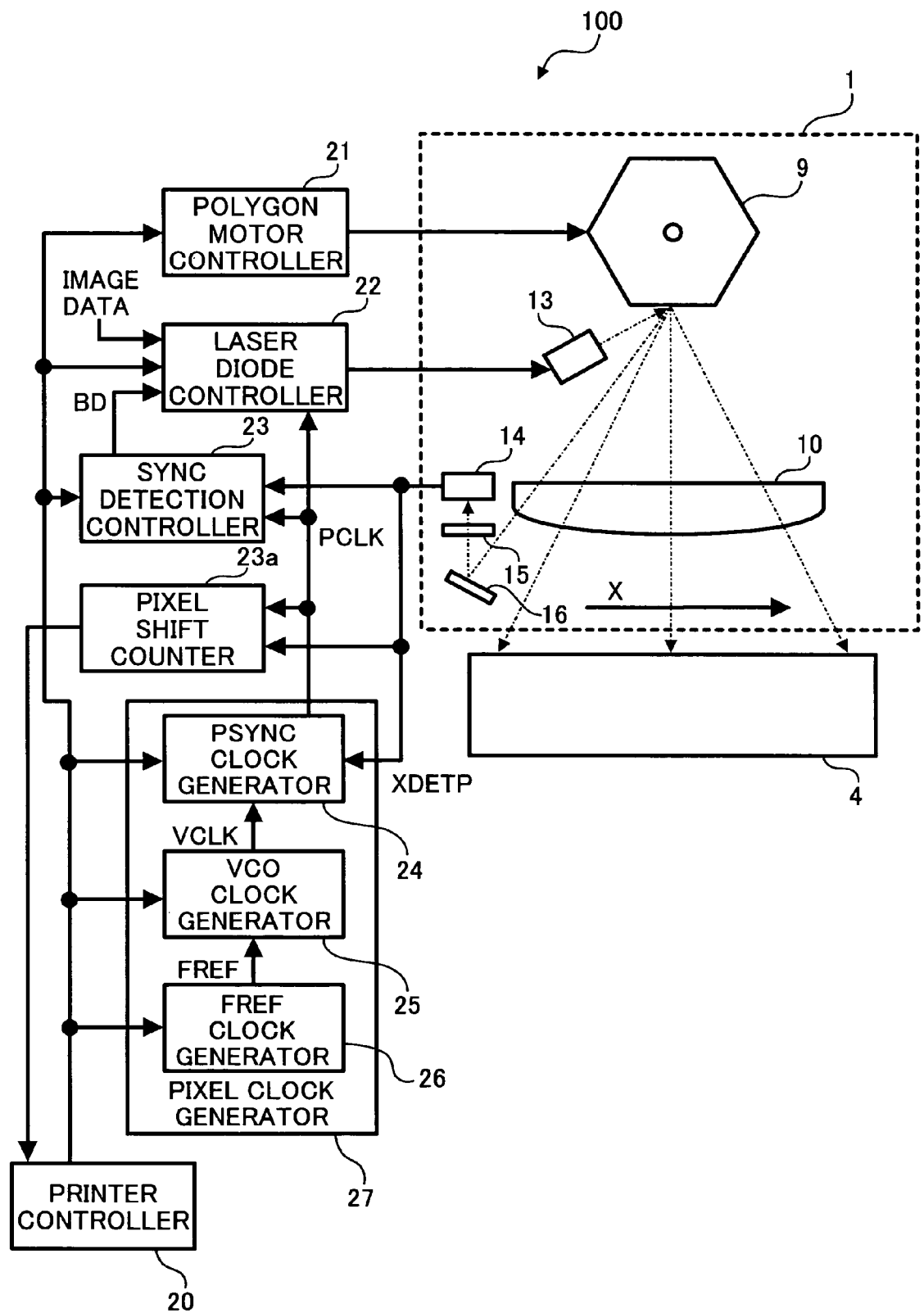
FIG. 2 is a block diagram of the image forming apparatus of FIG. 1.

The image forming apparatus 100 has a clock controlling system for controlling the light beam to form an image on the photosensitive drum 4 and performing an image magnification correction in a main scanning direction. As illustrated in FIG. 2, the image forming apparatus 100 includes a printer controller 20, a polygon motor controller 21, a laser diode controller 22, a sync (synchronization) detection controller 23, a pixel shift counter 23a, and a pixel clock generator 27. These components and the optical scanning unit 1 serve as the clock controlling system. The pixel clock generator 27 further includes a psync (phase-synchronization) clock generator 24, a VCO (voltage controlled oscillator) clock generator 25, and an FREF (frequency reference) clock generator 26.

In addition, as illustrated in FIG. 2, the optical scanning unit 1 further includes an LD (laser diode) unit 13, a beam sync (synchronization) sensor 14, a lens 15, and a mirror 16. The LD unit 13 includes a laser diode (not shown) for generating a laser light beam serving as a source beam of the scanning light beam LB. The beam sync sensor 14, the lens 15, and the mirror 16 which are as a whole referred to as a first sync detection mechanism are arranged at a position in one side of the optical scanning unit 1 where the scanning light beam LB starts each scanning motion in a main scanning direction X to detect the scanning light beam LB at the beginning of each scanning motion. That is, the scanning light beam LB at the beginning of each scanning motion is deflected by the mirror 16 towards the lens 15. The lens 15 gathers the light beam LB and causes the light beam LB to enter the beam sync sensor 14 so that the light beam LB is captured by the beam sync sensor 14.

The beam sync sensor 14 generates a start-sync detection signal XDETP upon detecting the light beam LB and sends the start-sync detection signal XDETP to the sync detection controller 23 and the psync clock generator 24. The pixel clock generator 27 generates a pixel clock signal PCLK and it to the laser diode controller 22 and the sync detection controller 23. The sync detection controller 23 initially turns on a BD (binding) signal for forcibly causing the laser diode to illuminate to initially detect the start-sync detection signal XDETP. After the initial detection of the start-sync detection signal XDETP, the sync detection controller 23 generates the BD signal based on the start-sync detection signal XDETP and the pixel clock signal PCLK with an appropriate timing so as to securely detect the start-sync detection signal XDETP without causing flare light effects.

The laser diode controller 22 generates a signal for controlling the laser diode of the laser diode unit 13 to alter between light-on and light-off states in accordance with the BD signal and an image signal input in synchronism with the pixel clock signal PCLK. The laser diode is thus driven and emits a laser light beam which runs as the light beam LB via the optical components of the optical scanning system 1 to scan the surface of the photosensitive drum 4, as described above.

The polygon motor controller 21 controls the polygon motor 8 to rotate at a predetermined number of revolution in accordance with a control signal from the printer controller 20.

Figure 3:
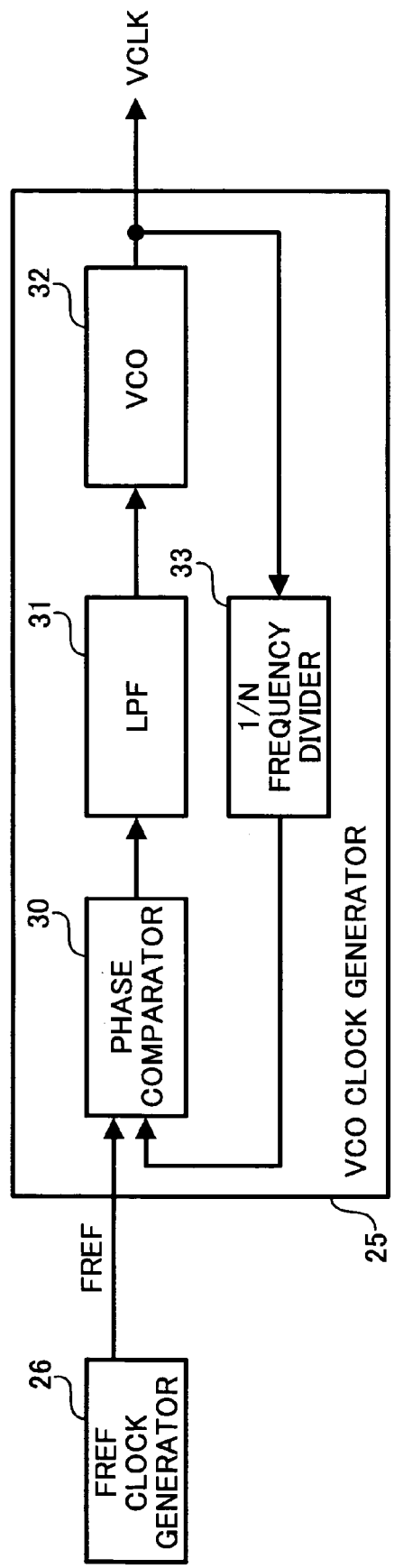
FIG. 3 is a block diagram of a voltage controlled oscillator included in a pixel clock generator of the image forming apparatus of FIG. 2.

In the pixel clock generator 27, the FREF clock generator 26 generates a clock signal FREF according to a control signal from the printer controller 20 and sends it to the VCO clock generator 25. The VCO generator 25 generates a clock signal VCLK based on the clock signal FREF and a control signal from the printer controller 20. The VCO clock generator 25 forms a PLL (phase locked loop) circuit and includes a phase compensator 30, an LPF (low pass filter) 31, a VCO (voltage controlled oscillator) 32, and a one-nth frequency divider 33, as illustrated in FIG. 3. In the VCO clock generator 25, the phase comparator 30 receives the FREF clock generator 26 generates and a signal output from the one-nth frequency divider 33 which divides a frequency of the clock signal VCLK into a one-nth frequency. The phase comparator 30 compares the phases of falling edges of these input signals and outputs an error element found between the two input signals in a form of a constant current. The LPF 31 eliminates unnecessary high frequency elements and noises from the signal output from the phase comparator 30 and sends a resultant signal to the VCO 32. The VCO 32 outputs an oscillation signal in accordance with the signal output from the LPF 31. Therefore, it becomes possible to vary the frequency of the clock signal VCLK by changing the frequency of the clock signal FREF and a frequency division ratio n. In this example, the frequency of the clock signal VCLK is predefined as, for example, eight times greater than the frequency of the pixel clock signal.

The psync clock generator 24 generates the pixel clock signal PCLK based on the clock signal VCLK and further the pixel clock signal PCLK in synchronism with the start-sync detection signal XDETP. Further, the psync clock generator 24 shifts the rising phase of the pixel clock signal PCLK for acceleration or delay by an approximately half cycle of the clock signal VCLK, for example, in accordance with predefined correction data for the image magnification correction sent from the printer controller 20.

Figure 4:
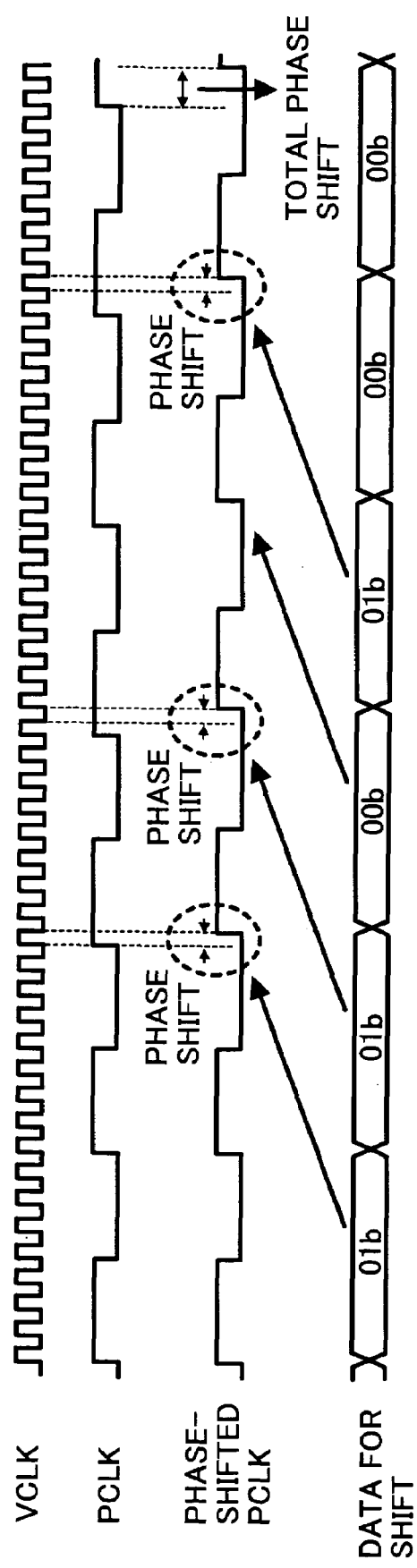
FIG. 4 is a time chart for explaining relationships among signals of VCLK, PCLK, phase-shifted PCLK, and correction data.

As shown in FIG. 4, the width of the pixel clock signal PCLK is varied in accordance with the predefined correction data sent from the printer controller 20. In this embodiment, correction data "00b" represents an instruction for no correction, for example. Correction data "01b" represents an instruction for delaying the pixel clock signal PCLK by one-sixteenth of the pixel clock signal PCLK. Correction data "10b" represents an instruction for accelerating the pixel clock signal PCLK by one-sixteenth of the pixel clock signal PCLK. The correction data is transmitted by the printer controller 20 in synchronism with the pixel clock signal PCLK and is reflected to a rising edge of the subsequent pixel clock signal PCLK. The correction data "00b" causes the pixel clock signal PCLK to have the frequency eight times greater than the frequency of the pixel clock signal. The correction data "01b" causes the pixel clock signal PCLK to have the rising edge delayed by a half cycle of the clock signal VCLK, that is, one-sixteenth of the clock signal PCLK. After the correction performed with the correction data "01b," the pixel clock signal PCLK maintains the delay of one-sixteenth of the pixel clock signal PCLK relative to the original pixel clock signal PCLK. In the operation shown in FIG. 4, the shift for delay of one-sixteenth of the pixel clock signal PCLK is performed three times and, as a result, the pixel clock signal PCLK has the phase with the delay of three-sixteenths of the pixel clock signal PCLK. In other words, with this operation of FIG. 4, an image magnification ratio is corrected by the phase of three-sixteenths of the pixel clock signal PCLK. In this way, the image forming apparatus 100 performs the image magnification correction.

Figure 5A:
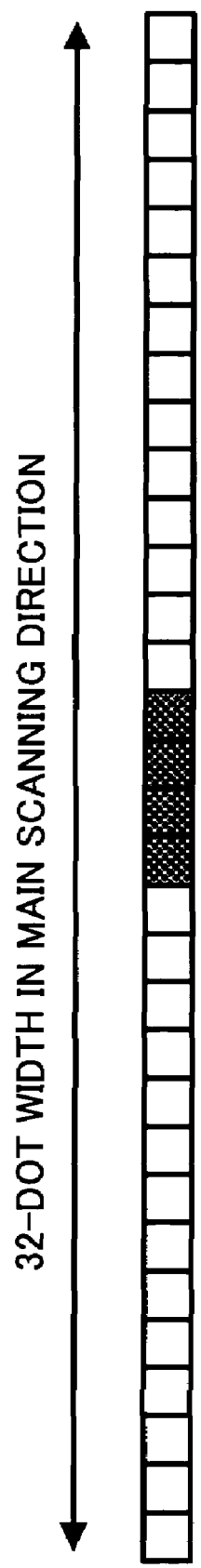
FIGS. 5A and 5B are illustrations for explaining a placement of phase-shifted pixels in an image of, for example, 32-dot width in the main scanning direction.
Figure 5B:
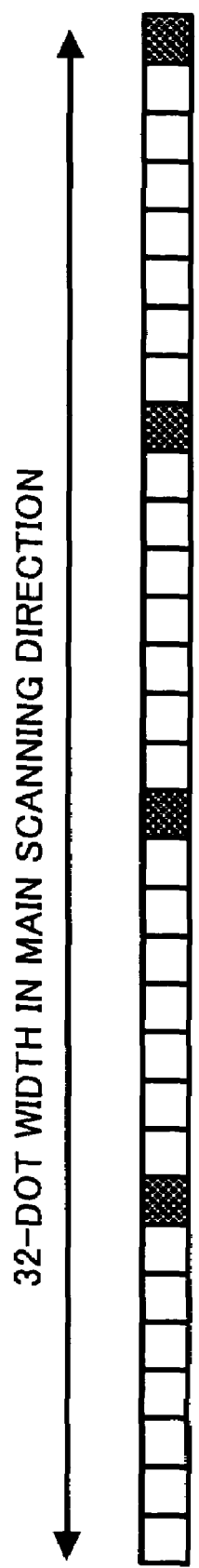

Examples of actual pixel data change by the phase shift operation for the image magnification correction are demonstrated in FIGS. 5A and 5B. In these examples shown in FIGS. 5A and 5B, an image width in the main scanning direction is set to 32 dots, for example, and the phase shift is performed by four-sixteenths of the pixel clock signal PCLK, for example. When such phase shift is performed on four successive pixels, as illustrated in FIG. 5A, an image of these four successive pixels would locally appear to be expanded or shrunk. As an alternative way to improve such appearance, the phase-shift pixels may be randomly or evenly inserted to the 32-dot-width image at an eight-dot cycle, as illustrated in FIG. 5B. The cycle (i.e., the eight-dot cycle) for the insertion of the phase-shift pixels eight-dot cycle is calculated based on an equation $f=w/n$, in which $f$ is the cycle to insert the phase-shift pixels, $w$ is the image width, and $n$ is the number of the phase-shift pixels. The calculation is not limited to the above way and calculations other than using the above equation can be adopted as long as they distribute the phase-shift pixels randomly or evenly within an image area.

Figure 6:
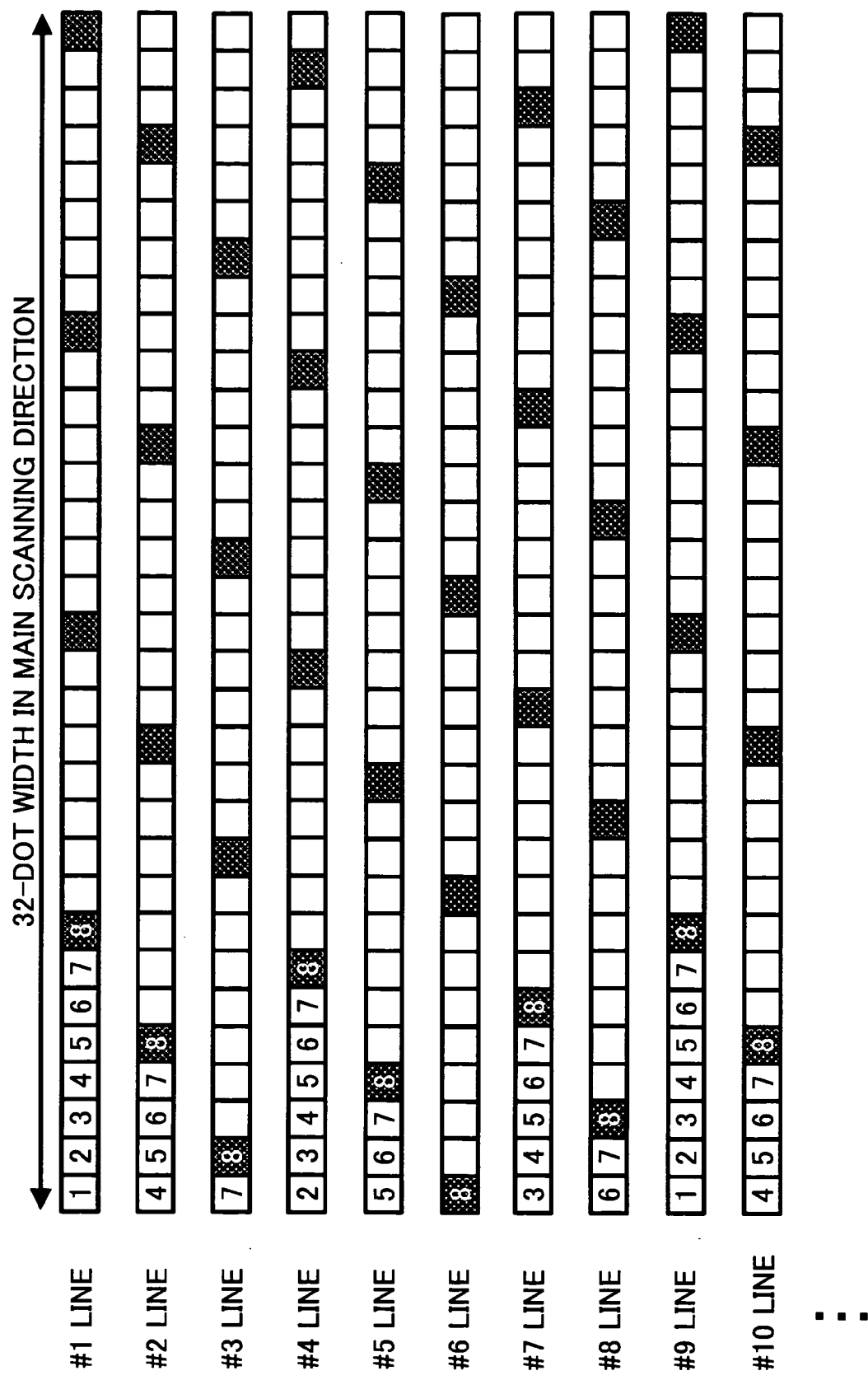
FIG. 6 is an illustration for explaining a placement of phase-shifted pixels in a manner such that the phase-shifted pixels are not aligned in a sub-scanning direction.

Referring to FIG. 6, another example of the pixel data change by the phase shift operation for the image magnification correction is explained. In this correction, as illustrated in FIG. 6, the phase-shift pixels are randomly or evenly inserted into the image in the main scanning direction and the positions of such random or even insertion of the phase-shift pixels are changed per main scanning line such that the phase-shift pixels are not aligned in the sub-scanning direction.

In FIG. 6, the image width in the main scanning direction is set to 32 dots, for example, and four pixels to be phase-shifted at the eight-dot cycle are inserted into each main scanning line. The position of each one of the four phase-shift pixels is determined with the pixel shift counter 23a for counting the number of the pixel clock signals PCLK. That is, in the first main scanning line, the pixel shift counter 23a is controlled to start the counting at the first dot (i.e., a scan start dot) of the 32-dot main scanning line, and the phase-shift is performed each time the pixel shift counter 23a has one of values 8, 16, 24, and 32. For, the second main scanning line and successive lines, an amount of dot position change can be sought based on an equation nv=c*3/7, in which nv is an amount of dot position change and c is the cycle of insertion of the phase-shift pixels (i.e., eight pixels). The amount of dot position change per main scanning line is sought as three dots. Accordingly, the positions of the phase-shift pixels are changed by three dots per each main scanning line and, when the accumulated amount of dot position change exceeds the phase-shift pixel cycle (i.e., eight pixels), an excess amount is applied relative to the positions of the phase-shift pixels in the first main scanning line.

More specifically, in FIG. 6, the pixel shift counter 23a starts its counting from a value of (1+3)=4 to change the dot position in the second main scanning line, so that the positions of the phase-shift pixels are shifted forward by three dots relative to the positions of the phase-shift pixels in the first main scanning line. Similarly, the pixel shift counter 23a starts the counting from a value of (4+3)=7 to change the dot position in the third main scanning line, so that the positions of the phase-shift pixels are shifted forward by three dots relative to the positions of the phase-shift pixels in the second main scanning line. For the fourth main scanning line, the pixel shift counter 23a should start the counting from a value of (7+3)=10 to change the dot position in the third main scanning line. This value however exceeds the phase-shift pixel cycle and therefore an excess amount which is 2 (i.e., 10−8=2) is set as a start value for the pixel shift counter 23a.

In this way, the image forming apparatus 100 can change the start values of the pixel shift counter 23a and accordingly shifts the positions of the phase-shift pixels so as to perform the image magnification correction.

The way of calculation for obtaining the amount of dot position change per main scanning line is not limited to the one described above and any one of other ways can be applied as long as it changes the positions of the phase-shift pixels per main scanning line such that the phase-shift pixels are not aligned in the sub-scanning direction.

Figure 7:
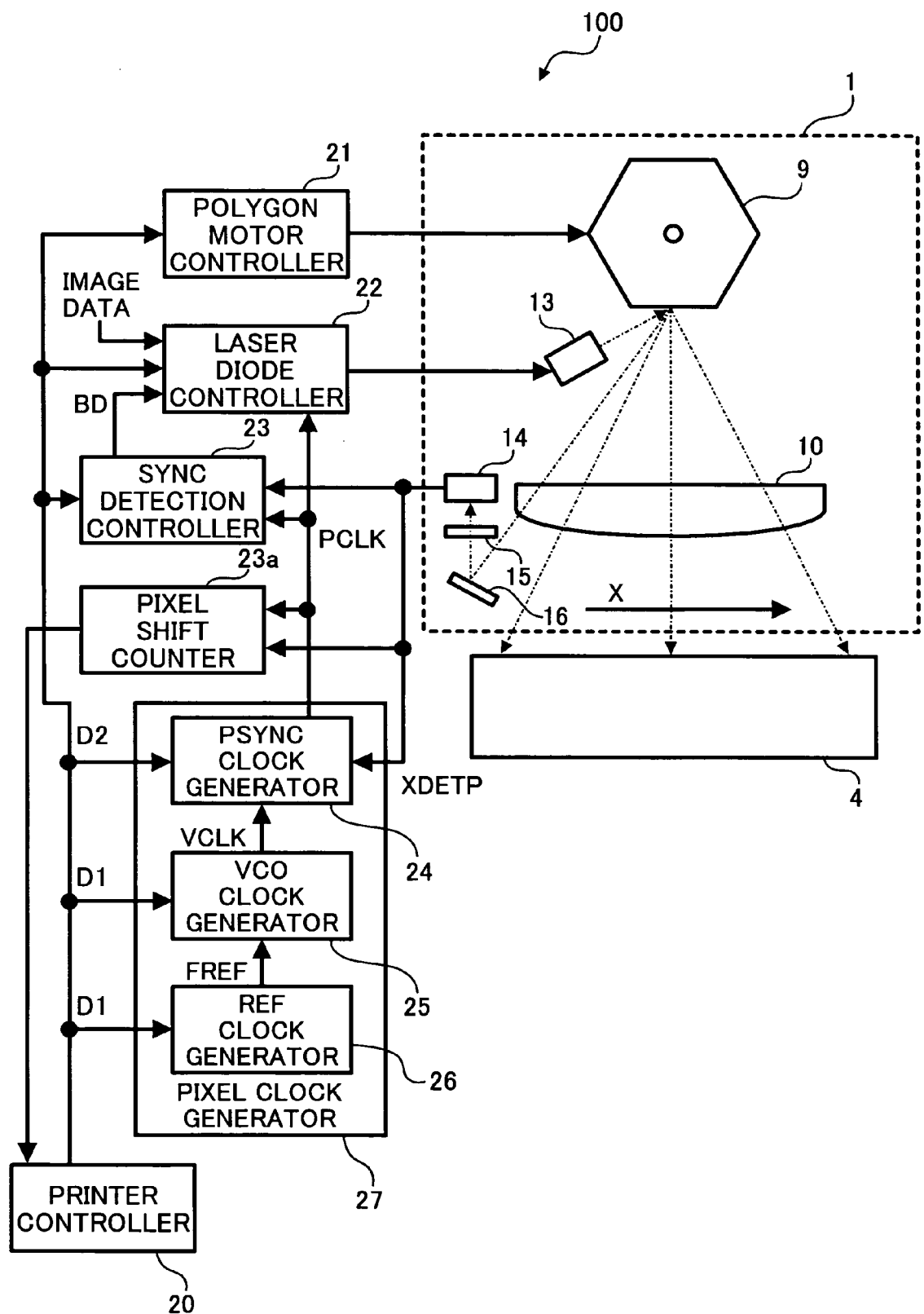
FIG. 7 is the block diagram of FIG. 2 with additional indication of correction data D1 and D2 from a printer controller to a pixel clock generator.

FIG. 7 shows a case in which the printer controller 20 transmits correction data D1 to the VCO clock generator 25 and/or the FREF clock generator 26 and correction data D2 to the psync clock generator 24. With the input of the correction data D1, the frequency of the RFEF clock signal generated by the FREF clock generator 26 and the ratio of the frequency division by the VCO clock generator 25 are changed to vary the clock signal VCLK in an arbitrary manner. Also, with the input of the correction data D2 to the psync clock generator 24, the phase of the rising edge of the pixel clock signal PCLK can be controlled for an acceleration or a delay by a half cycle of the clock signal VCLK.

Figure 8:
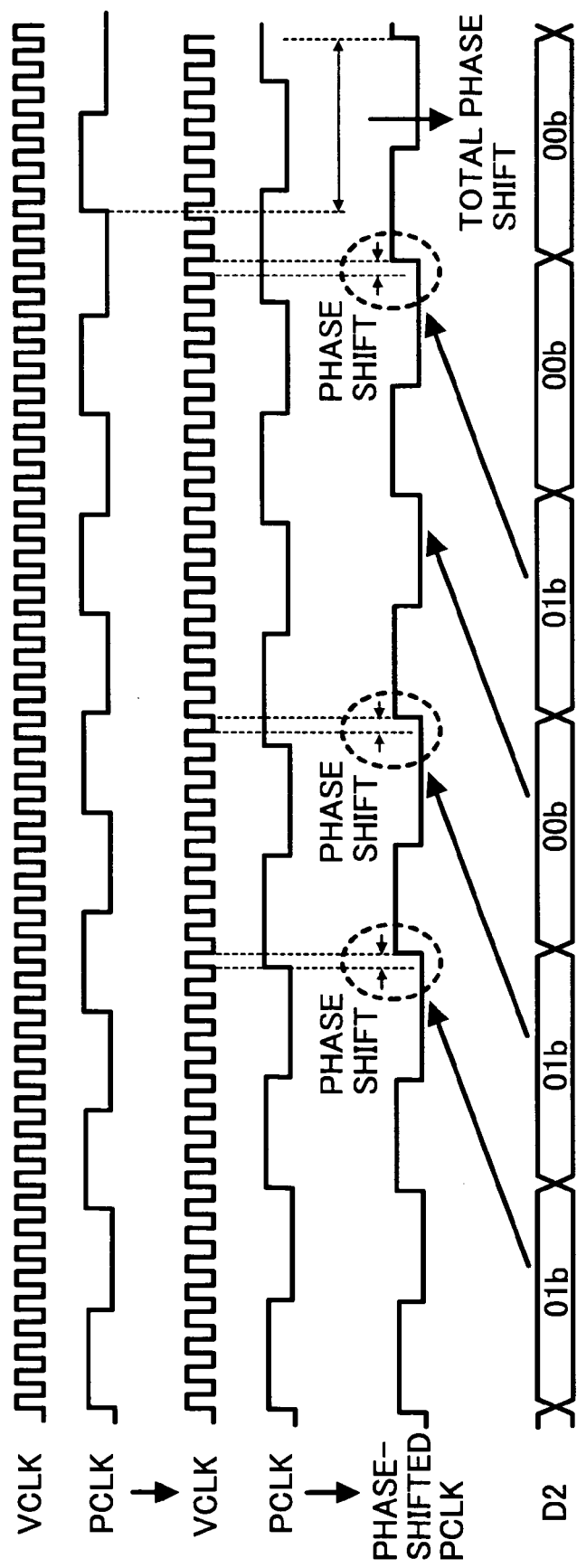
FIG. 8 is a time chart for explaining relationships among signals of VCLK, PCLK, delayed VCLK, delayed PCLK, phase-shifted PCLK, and correction data D2.

FIG. 8 shows an exemplary relationship among the clock signal VCLK, the pixel clock signal PCLK, and the correction data D2. In FIG. 8, when the correction data D2 is "00b," for example, it represents an instruction for no correction. When the correction data D2 is "01b," for example, it represents an instruction for delaying the pixel clock signal PCLK by one-sixteenth of the pixel clock signal PCLK. When the correction data D2 is "10b," for example, it represents an instruction for accelerating the pixel clock signal PCLK by one-sixteenth of the pixel clock signal PCLK. The correction data D2 is transmitted by the printer controller 20 in synchronism with the pixel clock signal PCLK and is reflected to a rising edge of the subsequent pixel clock signal PCLK. When the correction data D2 is "00b," it causes the pixel clock signal PCLK to have the frequency eight times greater than the frequency of the pixel clock signal. When the correction data D2 is "01b," it causes the pixel clock signal PCLK to have the rising edge delayed by a half cycle of the clock signal VCLK, that is, one-sixteenth of the clock signal PCLK. After the correction performed with the correction data D2 when it is "01b," the pixel clock signal PCLK maintains the delay of one-sixteenth of the pixel clock signal PCLK relative to the original pixel clock signal PCLK. In the operation shown in FIG. 8, the shift for delay of one-sixteenth of the pixel clock signal PCLK is performed three times and, as a result, the pixel clock signal PCLK has the phase with the delay of three-sixteenths of the pixel clock signal PCLK.

Assuming that the frequency of the pixel clock signal PCLK changes such as 65.0 MHz, 65.1 MHz, 65.2 MHz, and so on, for example, by steps of 0.1 MHz and that the image magnification correction needs to be corrected to 65.13 MHz. In this case, the frequency of the pixel clock signal PCLK can be adjusted to the 65.1 MHz and the remaining portion of 0.03 HMz can be covered by the phase shift of the clock signal VCLK.

Figure 9:
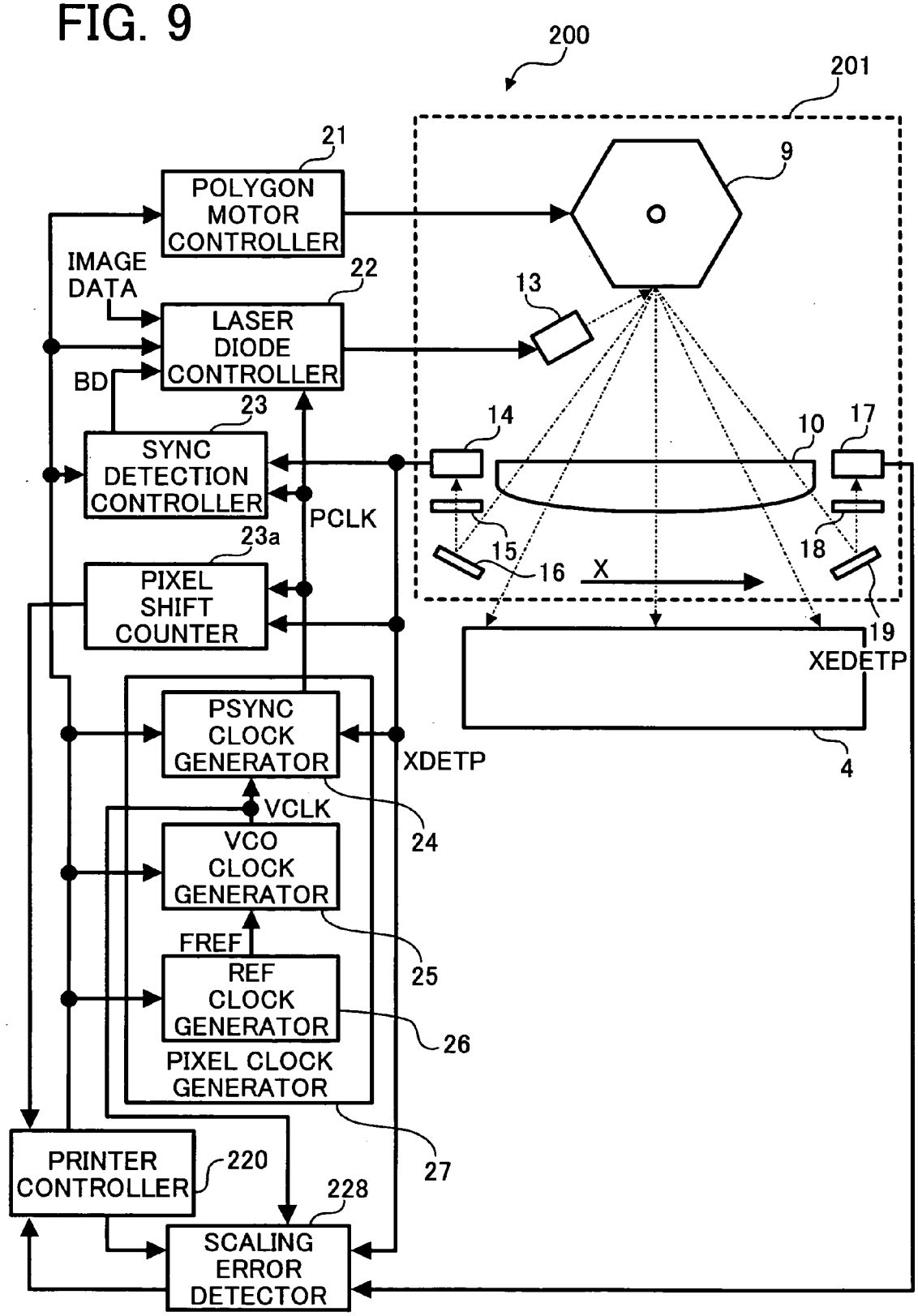
FIG. 9 is a block diagram of another image forming apparatus according to an exemplary embodiment of the present invention.

Next, an image forming apparatus 200 according to an exemplary embodiment of the present invention is explained with reference to FIG. 9. The image forming apparatus 200 of FIG. 9 is similar to the image forming apparatus 100 of FIG. 2, except for an optical scanning unit 201 and a scaling error detector 228 and associated wiring arrangements described below.

The optical scanning unit 201 is a unit based on the optical scanning unit 1 of FIG. 2 with an addition of a second sync detection mechanism. The second sync detection mechanism includes a beam sync sensor 214, a lens 215, and a mirror 216 which are arranged at a position in one side of the optical scanning unit 1, opposite to the first sync detection mechanism, where the scanning light beam LB ends each scanning motion in the main scanning direction X so as to detect the scanning light beam LB at the end of each scanning motion. That is, the scanning light beam LB at the end of each scanning motion is deflected by the mirror 216 towards the lens 215. The lens 215 gathers the light beam LB and causes the light beam LB to enter the beam sync sensor 214 so that the light beam LB is captured by the beam sync sensor 214.

In the image forming apparatus 200, the beam sync sensor 14 generates a start-sync detection signal XDETP upon detecting the light beam LB at the beginning of the scanning motion and sends the start-sync detection signal XDETP to the scaling error detector 228, and the beam sync sensor 214 generates an end-sync detection signal XEDETP upon detecting the light beam LB at the end of the scanning motion and sends the end-sync detection signal XEDETP to the scaling error detector 228. The scaling error detector 228 calculates a time period between falling edges of the detection signals XDETP and XEDETP and obtains a difference between the time period sought through the calculation and a predetermined reference time period by a comparison of the two. Then, the scaling error detector 228 shifts the phases of the pixel clock signal PCLK by the difference obtained. Thereby, an image magnification in the main scanning direction is corrected.

Figure 10:
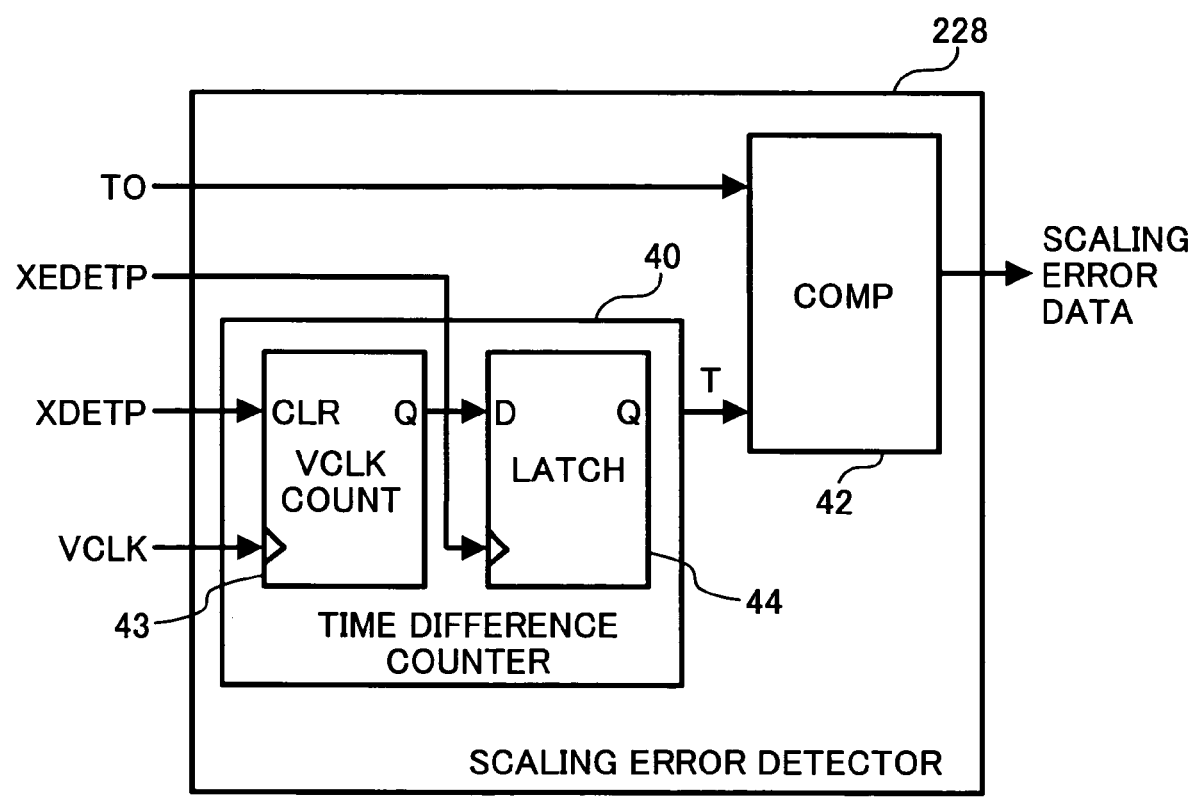
FIG. 10 is a block diagram of a scaling error detector included in the image forming apparatus of FIG. 9.

An exemplary structure of the scaling error detector 228 is shown in FIG. 10. As shown in FIG. 10, the scaling error detector 228 includes a time difference counter 40 and a comparator 42, and the time difference counter 40 includes a VCLK counter 43 and a count latch 44. The VCLK counter 43 is reset by the start-sync detection signal XDETP and increments its value by one with an input of the clock signal VCLK. The count value held by the VCLK counter 43 is latched by the count latch 44 by a falling edge of the end-sync detection signal XEDETP. That is, the value latched by the count latch 44 represents an actual time difference T1 between the signals XDETP and XEDETP. The comparator 42 compares the actual time difference T1 with a predetermined reference time difference T0 between the signals XDETP and XEDETP and obtains a difference between T1 and T0. Upon obtaining such difference, the comparator 42 sends it as scaling error data to the printer controller 220. The printer controller 220 calculates a number of pixels to be shifted and a shift direction, that is, whether the phase is advanced or delayed, based on the received scaling error, and sends the calculated data as correction data to the pixel clock generator 27. Upon receiving the correction data from the printer controller 220, the pixel clock generator 27 changes the phase of the pixel clock signal PCLK, as shown in FIG. 4, to correct the image magnification in the main scanning direction.

For example, when the counter value of the VCLK counter 43 for the predetermined reference time difference T0 between the signals XDETP and XEDETP is 20000 and the actual time difference T1 is measured as 20005 by the VCLK counter 43, the image is shrunk by five clock signals VCLK. In this case, the pixel clock generator 27 delays the phase of the pixel clock signal PCLK by a time period ten times of one-sixteenth of the pixel clock signal PCLK.

It is also possible to cause the printer controller 20 to transmit the correction data D1 and D2, described above with reference to FIG. 7, to the VCO clock generator 25 and/or the FREF clock generator 26 and to the psync clock generator 24, respectively. The variation step of the pixel clock signal PCLK is 0.1 MHz, for example, and the count value of the VCLK counter 43 for the predetermined reference time difference T0 between the signals XDETP and XEDETP with the pixel clock signal PCLK at a frequency f0 of 65.0 MHz is 20000, for example. Under these conditions, the count value of the VCLK counter 43 for the actual time difference T1 after the performance of the image magnification correction is 20037. In this case, the image is shrunk and needs to be expanded by a reduction of the frequency speed of the pixel clock signal PCLK and/or a delay of the phase of the pixel clock signal PCLK. When the correction is performed merely by the frequency of the pixel clock signal PCLK, a reduced frequency f1 is obtained by an equation f1=f0*(T0/T1). That is, f1=65 MHz*(20000/20037)=64.88 MHz. Since the variation step is 0.1 MHz, the reduced frequency f1 is either 64.8 MHz or 64.9 MHz. When the reduced frequency is determined as 64.9 MHz which is the closest to the calculation result, the correction for the amount of 0.02 MHz can be achieved by the phase shift of the pixel clock signal PCLK. In this case, the count value is sought as 20031 by a calculation of 65 MHz*20000/64.9 MHz. Accordingly, the number of the clock signals VCLK needed for the correction of 0.02 MHz is obtained by a calculation of 20037−20031=6. That is, six clock signals VCLK are needed to be delayed, meaning that the phases of twelve-sixteenths of the pixel clock signal PCLK are needed to be delayed.

In this example, the frequencies of the clock signal VCLK at the measurements of the predetermined reference time difference T0 and the actual time difference T1 are equal to each other.

Although the present embodiment measures once the time difference between the signals XDETP and XEDETP, it is possible to measure it multiple times and to use an average time difference, for example, so that measurement accuracy can be increased and, as a result, correction accuracy of the image magnification can be increased.

Figure 11:
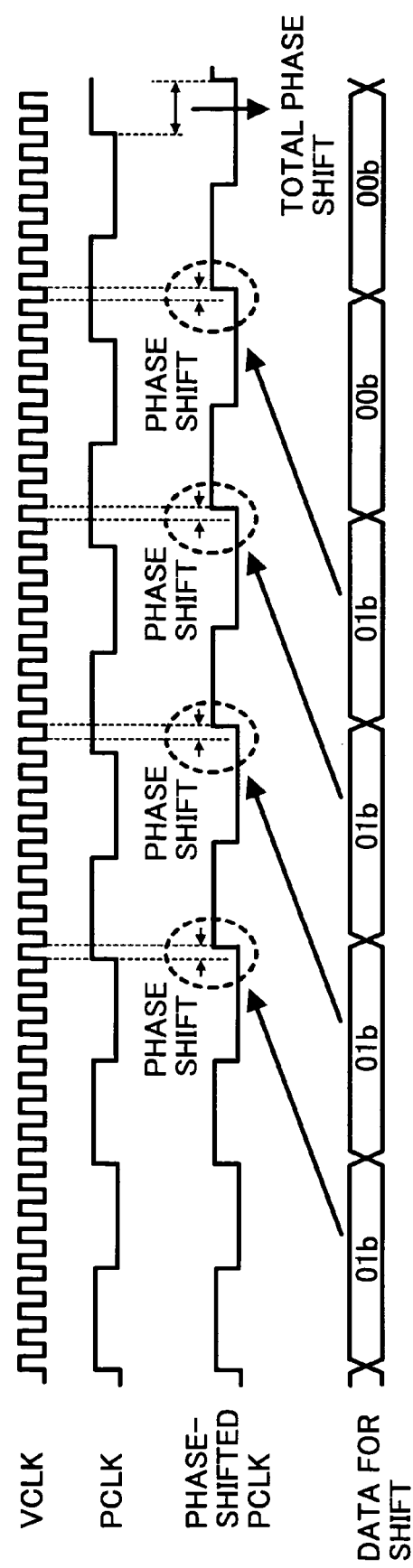
FIG. 11 is a time chart for explaining relationships among signals of VCLK, PCLK, phase-shifted PCLK, and correction data.

In the image forming apparatus 200, the polygon mirror 9 has six mirror surfaces, for example. It is possible to carry out the correction of the image magnification per each mirror surface of the polygon mirror to increase the accuracy of the correction. In this case, a time difference between the signals XDETP and XEDETP is previously measured for each surface of the polygon mirror 9 and an average of the six measurements is determined as the predetermined reference time difference T0. In an exemplary time chart of the PCLK phase shift shown in FIG. 11, the phase shift of the pixel clock signal PCLK is performed four times. By this operation, the phase of the pixel clock signal PCLK is delayed by four sixteenths of the pixel clock signal PCLK. Accordingly, this corrects the image magnification with an amount of four sixteenths of the pixel clock signal PCLK.

The count value of the VCLK counter 43 for the predetermined reference time difference T0 between the signals XDETP and XEDETP is 20000 and the measurement result (i.e., the counter value of the VCLK counter 43 for the actual time difference T1) is 20002. In this case, the image is shrunk by the count value difference of 2 and therefore the phase of the pixel clock signal PCLK needs to be delayed by two VLCK which is equivalent to four sixteenths of the pixel clock signal PCLK.

In FIG. 12, an exemplary operation of the image magnification correction for the six mirror surfaces of the polygon mirror 9. The operation starts with an action to raise a measurement start signal DETEN to a high state and then begins to measure a time period between the falling edges of the start-sync detection signal XDETP and the end-sync detection signal XEDETP for each mirror surface of the polygon mirror 9. If the laser diode of the laser diode unit 13 is not normally driven to emit the laser beam entering the sensor 17 of the second sync detection mechanism, the laser diode is forcibly driven by the measurement start signal DETEN to emit the laser beam for entering the sensor 17 to generate the end-sync detection signal XEDETP.

After the measurement start signal DETEN is turned on, a first input of the start-sync detection signal XDETP is detected as the signal XDETP for the first mirror surface of the polygon mirror 9. A next input is detected as the signal for the second mirror surface, and so forth. Thus, six of the signal start-sync detection signal XDETP corresponding the six mirror surfaces are detected. Likewise, six of the end-sync detection signal XEDETP are also detected in association with the six mirror surfaces.

In the measurement of each mirror surface, the VCLK counter 43 starts counting the number of VCLK by the trigger of the signal XDETP and the count value of the VCLK counter 43 is latched by the count latch 44 when the signal XEDETP is input. Based on the latched count value, correction data for the corresponding mirror surface is generated, which includes the data representing the number of pixels to be shifted and the shift direction (i.e., acceleration or delay). The correction data thus generated is stored in association with data representing the corresponding mirror surface. In FIG. 12, the correction data for the first through sixth mirror surfaces are represented by labels D11, D12, D13, D14, D15, and D16, respectively. Upon a completion of the measurements for the six mirror surfaces, the measurement start signal DETEN is fell down to a low state so that the measurement ends. Then, the image magnification correction for each mirror surface is performed based on the above-mentioned correction data D11–D16 stored in association with the data representing the corresponding mirror surface.

Figure 13:
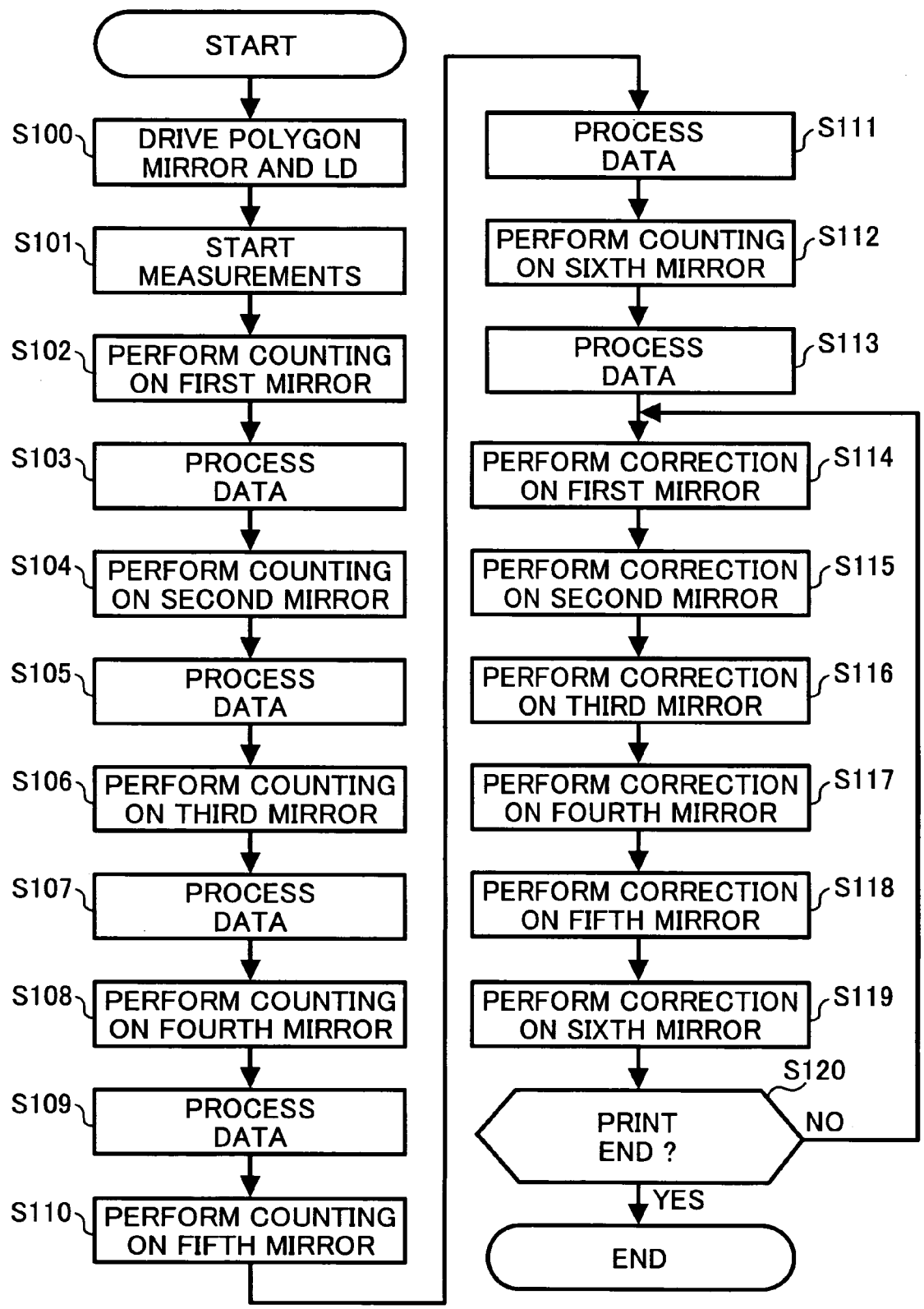
FIG. 13 is a flowchart showing an exemplary procedure of a basic image magnification correction performed by the image forming apparatus of FIG. 9.

FIG. 13 shows an exemplary operation of the above-described mirror surface measurement performed by the image forming apparatus 200. In Step S100, the polygon motor 8 is driven for rotation and the laser diode of the laser diode unit 13 is turned on to generate the start-sync detection signal XDETP and the end-sync detection signal XEDETP. Then, in Step S101, the measurement is started. In Step S102, the VCLK counter 43 performs the VCLK count on the first mirror. In Step S103, the printer controller 220 processes the count value to generate correction data and stores the correction data. Operations similar to those of Steps S102 and S103 are repeated in Steps S104 and S105 for the measurement on the second mirror surface, Steps S106 and S107 for the measurement on the third mirror surface, Steps S108 and S109 for the measurement on the fourth mirror surface, Steps S110 and S111 for the measurement on the fifth mirror surface, and Steps S112 and S113 for the measurement on the sixth mirror surface. Then, in Step S114, the image magnification correction is performed for the image data with respect to the first mirror surface based on the correction data stored. After that, the image magnification correction for the second mirror surface based on the stored correction data is performed, in Step S115, in a manner similar to the correction in Step S. Likewise, the image magnification corrections for the third, fourth, fifth, and sixth mirror surfaces based on the corresponding correction data stored are performed, in Steps S116, S117, S118, and S119, respectively. Then, in Step S120, whether a print process is ended is determined. That is, the image magnification corrections for the six mirror surfaces are repeated until the print process is ended. Once the print process is determined as ended, the operation of FIG. 13 ends. In this way, the image magnification of each mirror surface is securely corrected and a high quality image can be obtained.

If each of the mirror surfaces of the polygon mirror 9 is provided with a unique mark for identification, the correction for each mirror surface may easily be performed even when the polygon mirror 9 stops or changes its rotation speed (i.e., no generation of the signal XDETP). However, if such unique mark is not provided, six mirror surfaces cannot be identified particularly when the polygon mirror 9 stops or changes its rotation speed. In this case, the correction operation needs to be performed again so that the identifications for the six mirror surfaces are newly set up and the correction can be performed based on the new identifications. Therefore, unique marks to the mirror surfaces would not be necessary.

Figure 14:
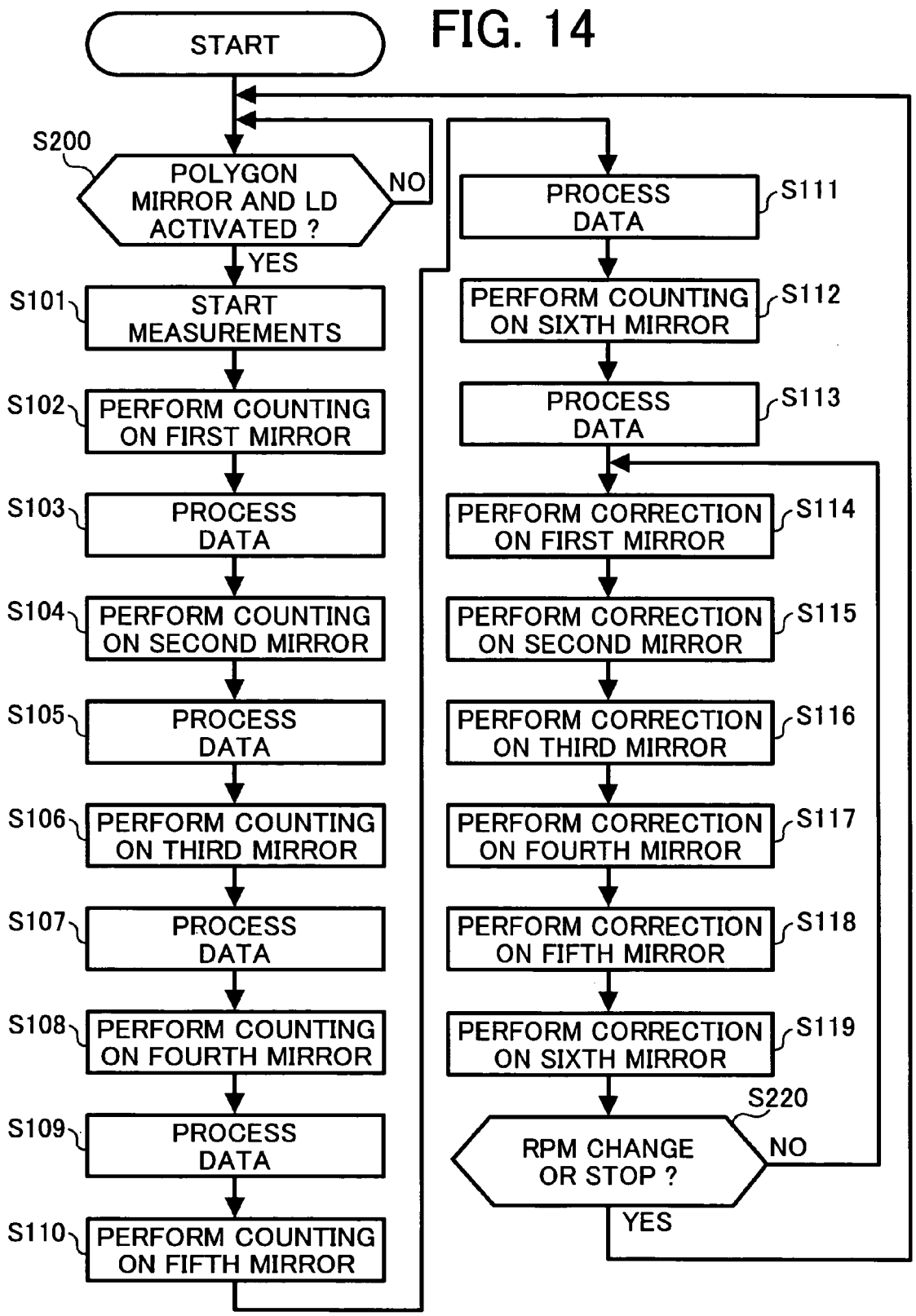
FIG. 14 is a flowchart showing an exemplary procedure of another image magnification correction in which a stop or a change in speed is observed with respect to a polygon mirror.

FIG. 14 shows an exemplary operation for the image magnification correction in which an observation is made on whether the polygon mirror 9 having no identification marks stops its rotation or changes the rotation speed. The correction operation of FIG. 14 is similar to the operation of FIG. 13, except for Steps S200 and S220. That is, in Step S200, a determination is performed whether the polygon mirror 9 is rotated and the laser diode unit 13 is emitting the light. When the polygon mirror 9 and the laser diode unit 13 are not determined as being activated, the process repeats the determination step. When they are determined as activated, the process proceeds to Step S101 and the above-explained operations are performed. In Step S220, a determination is made whether the polygon mirror 9 stops its rotation or changes the rotation speed. When the polygon mirror 9 is not determined as stopping its rotation (i.e., no generation of the signal XDETP) nor changing the rotation speed (i.e., different generation of the signal XDETP), the process goes back to Step S114 to repeat the correction performance. When the polygon mirror 9 is determined as stopping its rotation or changing the rotation speed, the process returns to Step S200 to repeat the whole procedure.

Figure 15:
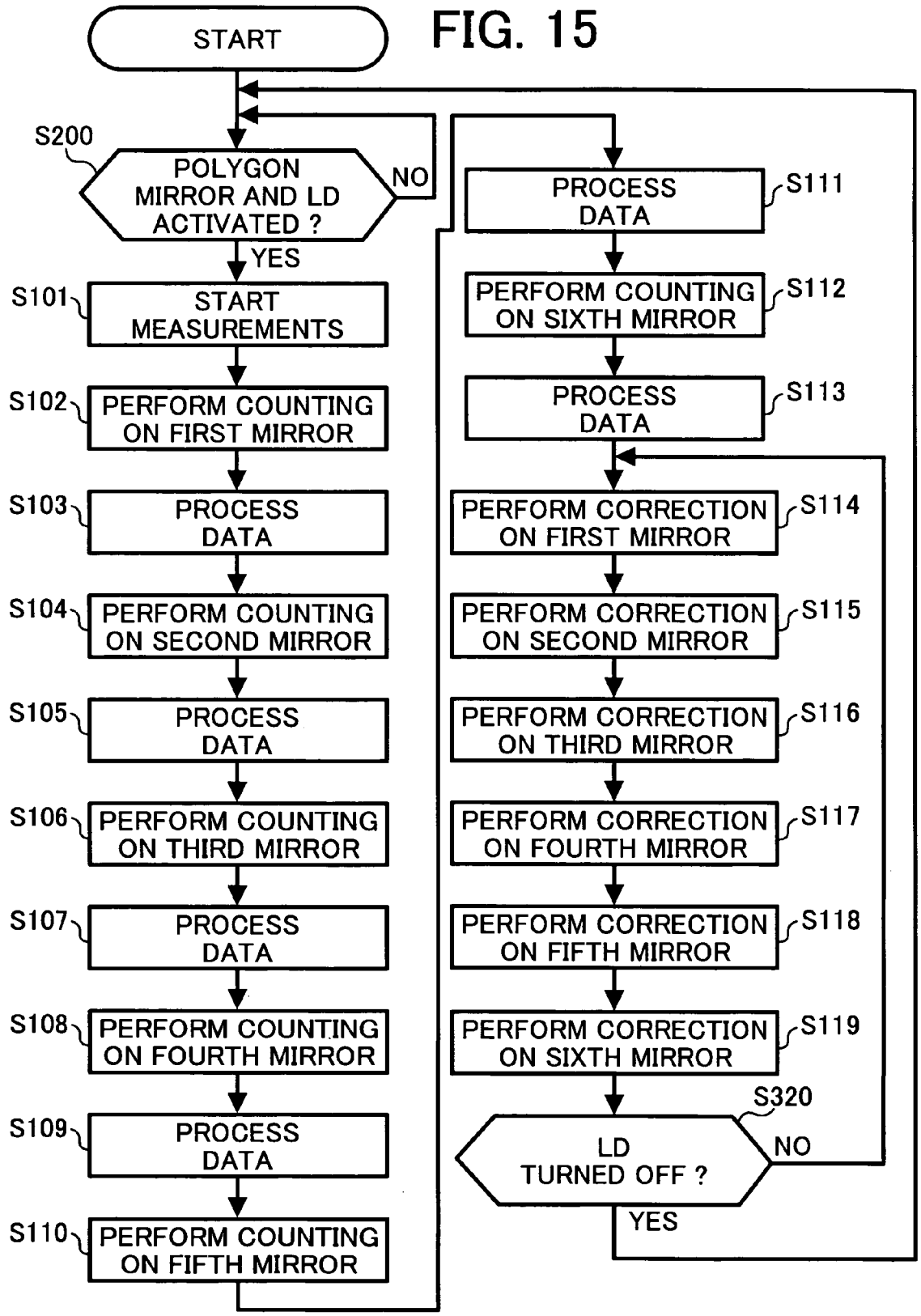
FIG. 15 is a flowchart showing an exemplary procedure of another image magnification correction in which a turn-off of a light source is observed.

FIG. 15 shows another exemplary operation for the image magnification correction in which it is observed whether the laser diode unit 13 stops emitting the laser beam. The correction operation of FIG. 15 is similar to the operation of FIG. 14, except for Step S320 in which a determination is performed as to whether the laser diode unit 13 has stopped emitting the laser beam (i.e., no generation of the signal XDETP). When it is determined that the laser diode unit 13 has stopped emitting the laser beam, the process goes back to Step S114 to repeat the correction performance. When the laser diode unit 13 is determined as stopping emitting the laser beam, the process returns to Step S200 to repeat the whole procedure.

Figure 16:
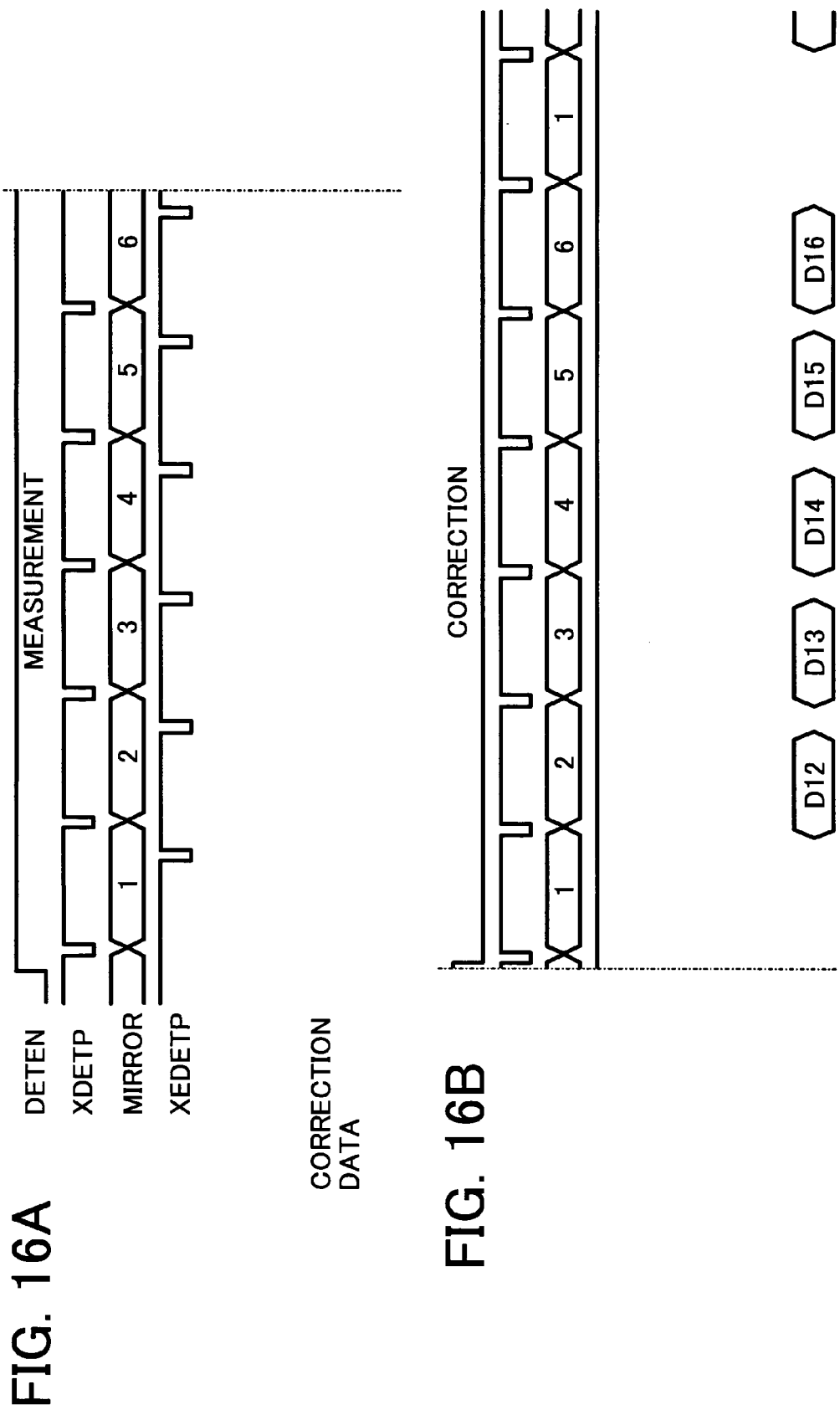
FIG. 16 is a time chart for explaining an exemplary procedure of another image magnification correction in which time information of a first mirror is used as a reference for other mirrors.
Figure 17:
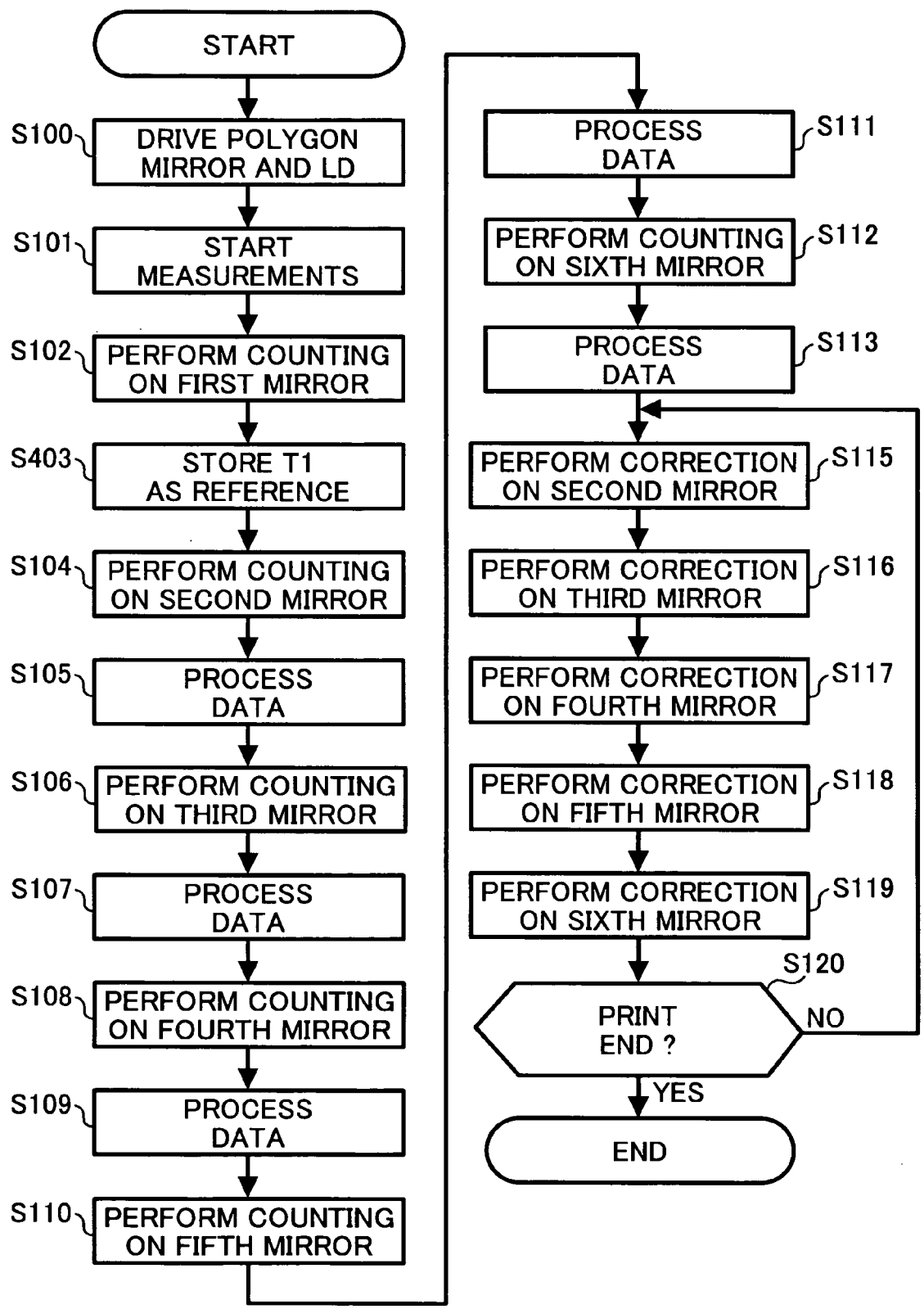
FIG. 17 is a flowchart showing an exemplary procedure of the image magnification correction of FIG. 16.

In the correction operation shown in the time chart of FIG. 12, the reference data (i.e., the predetermined reference time difference T0) is previously stored and is compared with the actual time data (e.g., the actual time difference T1) for each mirror surface of the polygon mirror 9. Alternative to this configuration, it is possible to have no prestored reference data but to use the actual time difference T1 obtained from the first mirror surface as substituting reference data to be compared with subsequent actual time differences T2, T3, T4, T5, and T6 generated from the second, third, fourth, fifth, and sixth mirror surface, respectively. An exemplary time chart for such procedure is shown in FIG. 16. Since the actual time difference T1 is used as the reference data, as described above, the correction data for the first mirror is not generated and the image magnification correction is not performed, as demonstrated in FIG. 16. Accordingly, the actual time difference T2 is compared with the actual time difference T1 to generate correction data D12. Subsequent correction data D13–D16 are generated based on the comparison of actual time differences T3–T6, respectively with the actual time difference T1. An exemplary procedure of this correction operation is shown in FIG. 17, which is similar to that of FIG. 13, except for a substitution of Step S403 for Step S103 and an elimination of Step S114. That is, in Step S403, the actual time difference T1 measured for the first mirror surface is stored in the memory. The reason for the elimination of Step S114 is that the correction for the first mirror surface is not performed, as described above. Thus, the image magnification of each mirror surface is securely corrected and a high quality image can be obtained.

Another exemplary operation for the image magnification correction is shown in FIG. 18, in which the measurement process is repeated during the correction process. In this procedure, the time measurement is performed sequentially for the six mirror surfaces after the measurement start signal DETEN is turned on. The actual time difference T1 is used as the reference data and the other actual time differences T2–T6 are used to generate correction data D12–D16, respectively, for the second through sixth mirror surfaces, respectively, based on the reference data (i.e., the actual time difference T1). The correction data D12–D16 generated are stored in the memory in association with the identifications of the respective mirror surfaces. After the measurements for the six mirror surfaces, the time measurement for the six mirror surfaces and the correction process based on the stored correction data D12–D16 relative to the second through sixth mirror surfaces are simultaneously performed. That is, the time measurement result for the first mirror surface is stored in the memory as the newest reference data. As for the second mirror surface, the correction process for the image magnification is carried out based on the correction data D12 while the time measurement is performed at the same time. This second measured time difference T2 is compared with the newest reference data and, based on the resultant data, second-generation correction data for the second mirror surface is produced and stored in the memory. Likewise, the time measurement and the image magnification correction are simultaneously performed for the third through sixth mirror surfaces. This procedure is continued until the measurement start signal DETEN is switched to the low state. Thus, the image magnification of each mirror surface is securely corrected and a high quality image can be obtained.

Another exemplary operation of the image magnification correction is shown in FIG. 19, in which the measurement and the correction processes are alternately performed. In this procedure, the time measurement is performed sequentially for the six mirror surfaces after the measurement start signal DETEN is turned on. Then, the measurement start signal DETEN is turned off so that the measurement is not performed but the correction process is carried out. After that, the measurement start signal DETEN is alternated between the high and low states so that the measurement and correction processes are alternately carried out. Thus, the image magnification of each mirror surface is securely corrected and a high quality image can be obtained.

Figure 20:
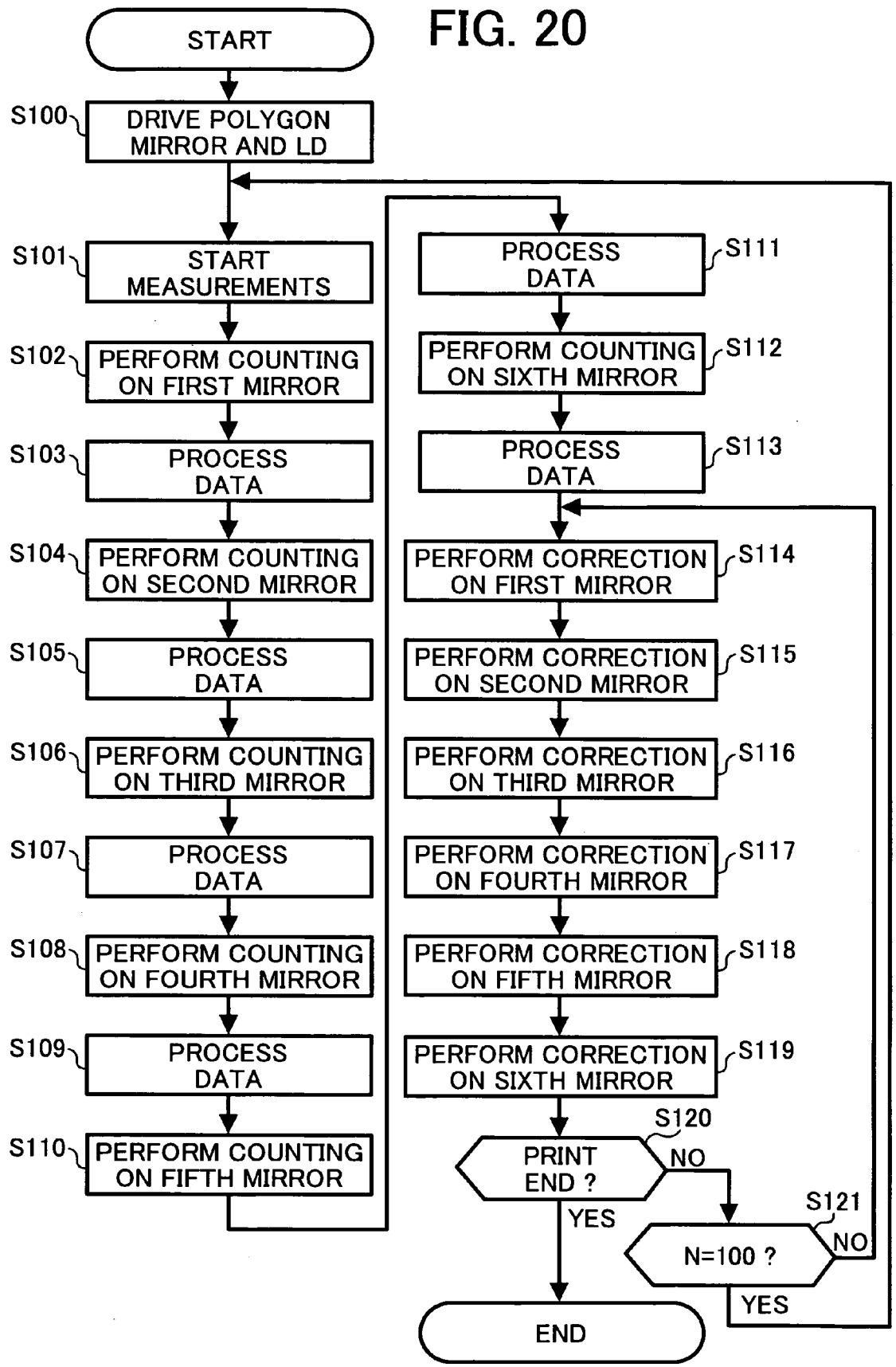
FIG. 20 is a time chart for explaining an exemplary procedure of another image magnification correction in which measurement is performed when a number of prints reaches a predetermined volume.

FIG. 20 shows another exemplary operation for the image magnification correction in which a time to perform the image magnification correction is determined. The operation of FIG. 20 is similar to that of FIG. 13, except for an addition of Step S121. In Step S121, a determination is carried out on whether a predetermined number of prints (e.g., 100 prints) is achieved. When the predetermined number of prints is determined as not being achieved, the process goes back to Step S114 to repeat the correction operation. When the predetermined number of prints is determined as being achieved, the process returns to Step S101 to repeat the whole operation.

The image magnification corrections of the image forming apparatuses 100 and 200 described above with reference to FIGS. 2 and 9 can also be applied to color image forming apparatuses. One example is a color image forming apparatus 300 of FIG. 21 which also uses the electrophotographic process.

An outline structure of the color image forming apparatus 300 is explained with reference to FIG. 21. In this color image forming apparatus 300, some components used therein bear functions similar to those of the image forming apparatus 100 of FIG. 1 and are therefore given the same reference numerals. These components are the optical scanning unit 1, the image transfer unit 3, the photosensitive drum 4, the cleaning unit 5, the discharging unit 6, and the charging unit 7. In addition to these components, the color image forming apparatus 300 further includes a development station 302, a bias roller 351, an intermediate transfer belt 352, a supporting roller 353, a driving roller 354, an image transfer unit 355, a bias roller 356, and a cleaning unit 357.

Figure 21:
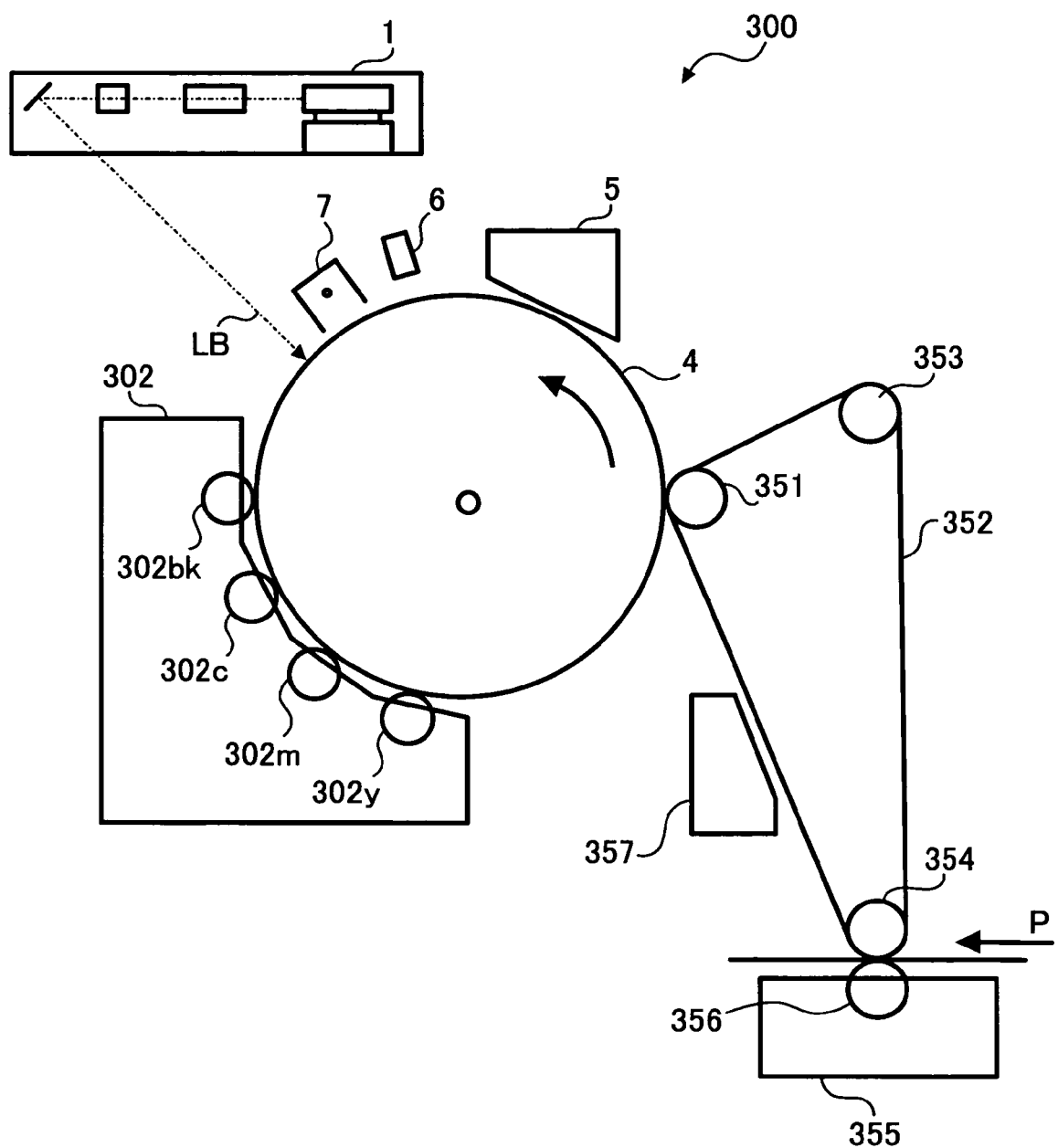
FIG. 21 is an illustration for explaining a color image forming apparatus according to another embodiment of the present invention.

In principle, the color image forming apparatus 300 of FIG. 21 performs the optical image writing to form an electrostatic latent image on the photoconductive drum 4 according to the given image data in a manner similar to the process performed by the image forming apparatus 100 of FIG. 1. During this optical image writing, the color image forming apparatus 300 performs the image magnification correction with the optical scanning unit 1 and the clock controlling system. The subsequent image development and transferring processes after the optical image writing are however slightly different from those performed by the image forming apparatus 100 of FIG. 1 due to the color image forming. Therefore, this section explains the color image forming operation to clarify the difference of the color image forming apparatus 300 from the image forming apparatus 100, but the description of the image magnification correction itself is not repeated since it is the same as that of the image forming apparatus 100.

As shown in FIG. 21, the photoconductive drum 4 is arranged at a position surrounded by the cleaning unit 5, the discharging unit 6, the charging unit 7, the development station 302, and the intermediate transfer belt 352 with the bias roller 351 and so on. Such photoconductive drum 4 is rotated counterclockwise. The development station 302 includes development units 302BK, 302C, 302M, and 302Y containing black, cyan, magenta, and yellow color toners, respectively, to develop the electrostatic latent images formed in black, cyan, magenta, and yellow colors, respectively. Each of development units 302BK, 302C, 302M, and 302Y includes a paddle (not shown) configured to mix the toner and a development sleeve (not shown) configured to move to transport the toner continuously to a position facing the photoconductive drum 4 to develop the electrostatic latent image. Although the development units 302BK, 302C, 302M, and 302Y are arranged in this order in the present embodiment, the arrangement is not limited to this order and other arbitrary orders may be applicable.

Upon starting a reproduction process, the optical scanning unit 1 performs the optical writing to write an electrostatic latent image onto the photoconductive drum 4 according to input image data for the color BK. While the leading edge portion of the BK latent image reaches a developing position of the development unit 302BK, the development unit 302BK is turned into an active state and the sleeve thereof is started to rotate so that the development with the BK toner is securely carried out over the entire portion of the BK latent image. Then, the development unit 302BK develops the BK latent image with the BK toner to form a BK toner image on the photoconductive drum 4. When the trailing edge portion of the BK latent image completes to pass through the developing position of the development unit 302BK, the development unit 302BK is turned into an inactive state so as to secure the subsequent developing process by the development unit 302C for developing the C latent image using the C toner. That is, by turning the development unit 302BK into an inactive state, the C latent image can be transported to the developing position of the development unit 302C without suffering damage when passing through the developing position of the development unit 302BK.

The BK toner image formed on the photoconductive drum 4 is transferred onto the surface of the intermediate transfer belt 352 which is rotated at the same speed as the photoconductive drum 4. This image transfer process is referred to as a belt transfer. The belt transfer is performed under the conditions that the photoconductive drum 4 and the intermediate transfer belt 352 are in contact with each other and that the bias roller 351 is applied with a predetermined bias voltage. The C, M, and Y toner images are subsequently formed on the photoconductive drum 4 and are in turn transferred onto the surface of the intermediate transfer belt 352 at the same position as the BK toner image so that a single multi-layered toner image, that is, a full-color image, is formed. The multi-layered toner image is then transferred onto the recording sheet P by one transfer operation.

The intermediate transfer belt 352 is extended with a predetermined tension between the bias roller 351, the supporting roller 353, and the driving roller 354 and is driven by a driving motor (not shown).

The image transfer unit 355 includes a clutch mechanism for causing the bias roller 356 supported by the image transfer unit 355 to move between positions to contact and separate from the surface of the intermediate transfer belt 352. The bias roller 356 is set at the position for contacting with pressure the intermediate transfer belt 352 during the transfer process of the multi-layered toner image onto the recording sheet P but is usually set at the position for separating from the intermediate transfer belt. Being in contact with the surface of the intermediate transfer belt 352 with pressure, the bias roller 356 is supplied with a predetermined bias voltage to transfer the multi-layered toner image onto the recording sheet P by one transfer operation.

The recording sheet P for receiving thereon the multi-layered toner image is transported towards an image transfer position between the intermediate transfer belt 352 and the bias roller 356 in synchronism with the transportation of the multi-layered toner image by the intermediate transfer belt 352. The recording sheet P, after the image transfer, is further transported to a fixing unit (not shown) by which the multi-layered toner image is melted and fixed onto the surface of the recording sheet P.

The cleaning unit 357 includes a blade (not shown) for clean off the surface of the intermediate transfer belt 352 and a clutch mechanism for causing the blade to move between positions to contact and separate from the surface of the intermediate transfer belt 352. The blade of the cleaning unit 357 is set at the position for separating from the intermediate transfer belt specifically during the transfer processes of the BK, C, M, and Y toner images onto the intermediate transfer belt 352.

Figure 22:
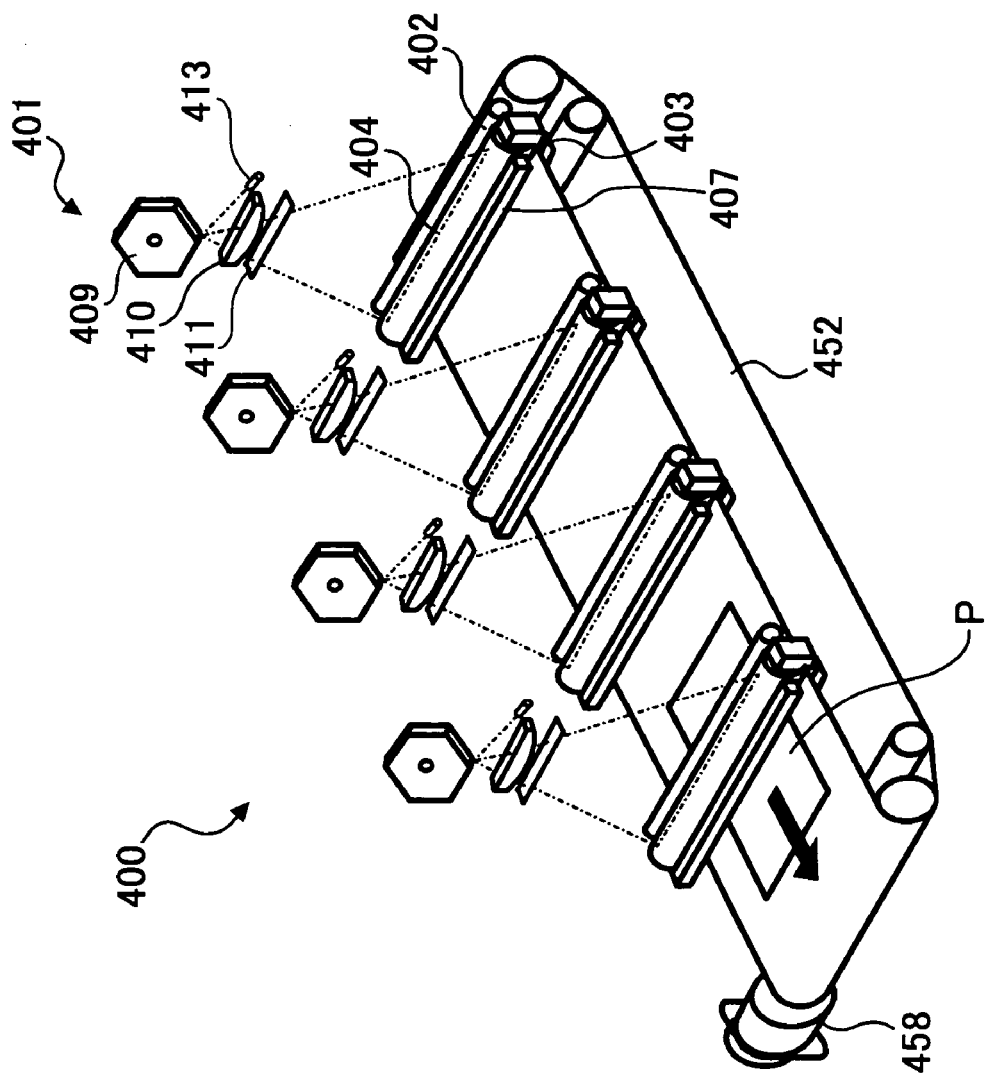
FIG. 22 is an illustration for explaining a color image forming apparatus according to another embodiment of the present invention.

Another example of the color image forming apparatus that performs the image magnification correction is a color image forming apparatus 400 shown in FIG. 22, also using the electrophotographic process. This color image forming apparatus 400 of FIG. 22 is provided with four sets of an optical scanning mechanism, each including an optical scanning unit 401, a polygon mirror 408, an fθ lens 410, a barrel toroidal lens (BTL) 411, and a laser diode (LD) unit 413. Each of the four sets of the optical scanning mechanism is provided with a clock controlling system similar to that described with reference to FIG. 2. The color image forming apparatus 400 is further provided with corresponding four sets of an image forming mechanism, each including a photoconductive drum 404, a development unit 402, a charging unit 407, and an image transfer unit 403. With these mechanisms, the color image forming apparatus 400 sequentially forms four color toner images in respective colors of yellow, magenta, cyan, and black. The four color toner images sequentially formed are in turn transferred directly onto the recording sheet P at the same position to overlay the four color toner images into one multi-layered color image on the recording sheet P. This transfer is achieved by a structure in that the four sets of the image forming mechanism are arranged in line along a plane parallel to a passage for the recording sheet P which is transported by an image transfer belt 452 driven by a transportation motor 458.

After the transfer process, the recording sheet P is further transported to a fixing unit (not shown) by which the multi-layered color toner image is melted and fixed onto the recording sheet P.

In the color image forming apparatus 400, the four optical scanning units 401 and the corresponding clock controlling systems independently perform the optical writing operations and the image magnification corrections for the respective color systems. As one exemplary way, it is possible to set the image magnification correction for one of the four images such as the black color image, for example, as a reference correction, and the corrections of the remaining images are carried out based on such reference correction.

Figure 23:
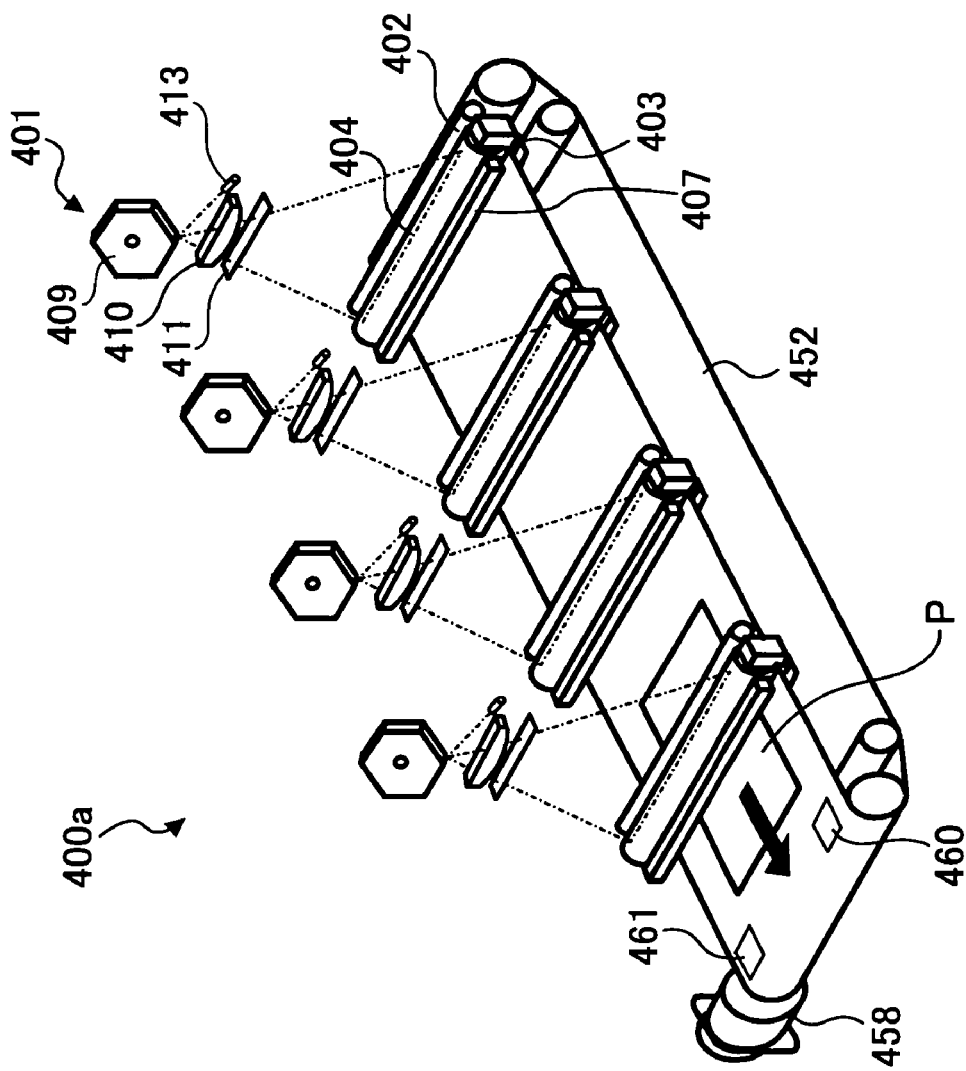
FIG. 23 is an illustration for explaining a modified apparatus based on the color image forming apparatus of FIG. 22.

Next, a color image forming apparatus 400*a* is explained with reference to FIGS. 23 and 24. The color image forming apparatus 400*a* of FIG. 23 is similar to the color image forming apparatus 400 of FIG. 22, except for pattern sensors 460 and 461 which are a reflection-type optical sensor. The pattern sensors 460 and 461 are disposed at positions facing both edges surfaces portions of the image transfer belt 452 to detect a position adjustment pattern formed on the image transfer belt 452. Based on the detection results, the color image forming apparatus 400*a* corrects the image displacements in the main scanning and sub-scanning directions and the image magnification in the main scanning direction.

Figure 24:
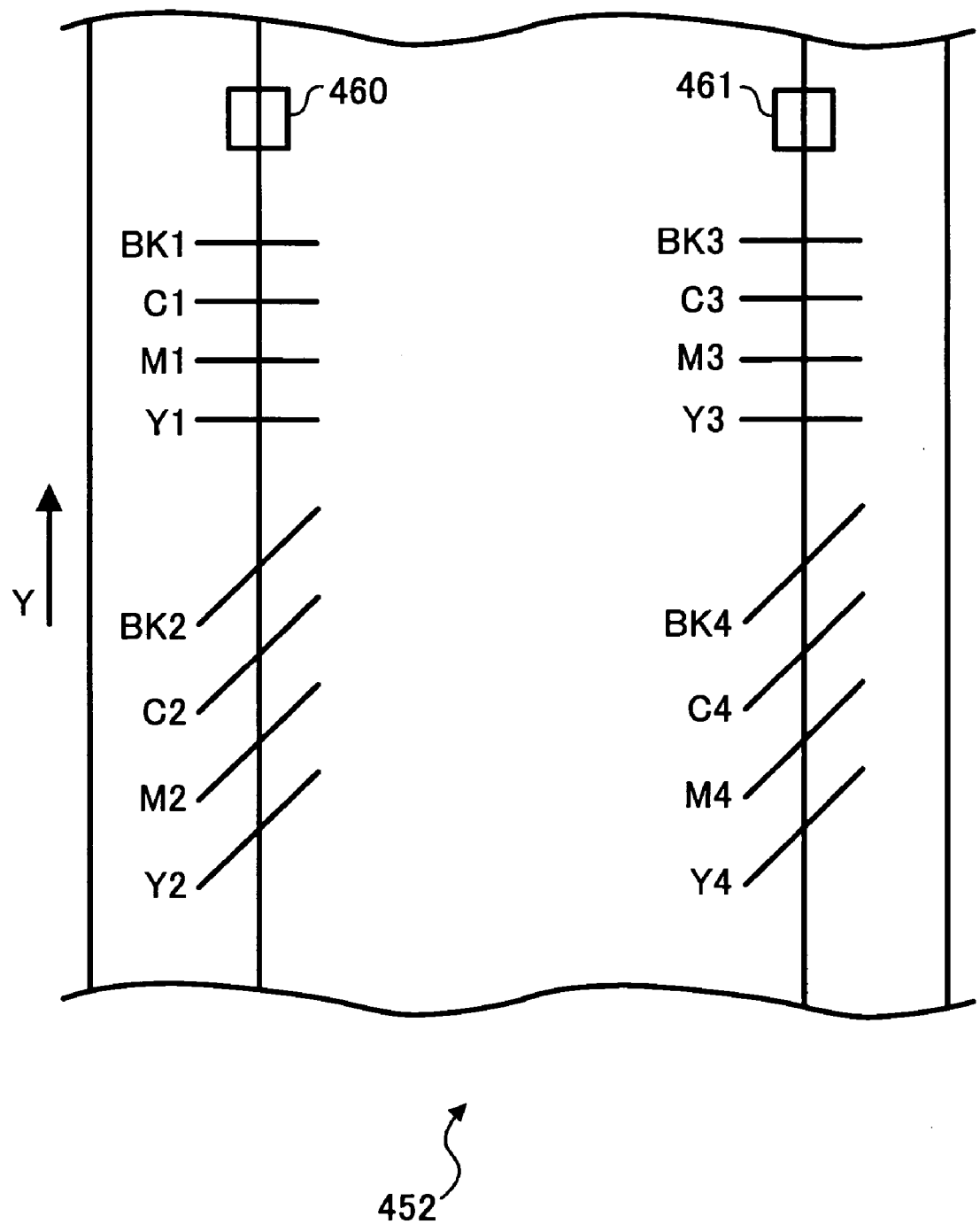
FIG. 24 is an illustration for explaining test pattern detectors provided to the modified apparatus of FIG. 23.

FIG. 24 shows one example of the position adjustment pattern. The position adjustment pattern is formed at a predetermined time on two edge surfaces (i.e., left and right edge surfaces in the drawing) of the image transfer belt 452. The position adjustment pattern includes four color-dependent sub-patterns which are equally spaced in the sub-scanning direction, as shown in FIG. 24. A black sub-pattern includes four line segments BK1, BK2, BK3, and BK4. The line segments BK1 and BK3 are parallel to the main scanning direction and the line segments BK2 and BK4 are oblique to the main scanning direction. Likewise, a cyan sub-pattern includes four line segments C1, C2; C3, and C4, a magenta sub-pattern includes four line segments M1, M2, M3, and M4, and a yellow sub-pattern includes four line segments Y1, Y2, Y3, and Y4.

The image transfer belt 452 having the position adjustment pattern thereon is moved in the sub-scanning direction by its sub-scanning rotation, and the position adjustment pattern is caused to pass by the pattern sensors 460 and 461 so that the pattern sensors 460 and 461 read the position adjustment pattern. The pattern data read by the pattern sensors 460 and 461 are sent to a printer controller 420 (see FIG. 25). The printer controller 420 then calculates differences in position, i.e., time, between the black image and other color images. The oblique line segments are used for the correction of the image position and the image magnification in the main scanning direction, and the traverse line segments are used for the correction of the image position in the sub-scanning direction.

To correct the image magnification for the cyan color image, for example, in the main scanning direction, calculated time periods TBK12, TC12, TBK34, TC34, TBKC12, and TBKC34 are used. The time period TBK12 is a time period from the detection of the line segment BK1 to the detection of the line segment BK2, the time period TC12 is from the line segment TC1 to the line segment TC2. Likewise, the time period TBK34 is a time period from the detection of the line segment BK3 to the detection of the line segment BK4, the time period TC34 is from the line segment TC3 to the line segment TC4. The time period TBKC12 is a time difference between the time periods TBK12 and TC12, and time period TBKC34 is a time difference between the time periods TBK34 and TC34. An error amount of the image magnification for the cyan image relative to the black image is obtained by subtraction of the time period TBKC12 from the time period TBKC34. Accordingly, the phase of the pixel clock signal PCLK for the cyan image is shifted by the above-described image magnification error amount. Thereby, the image magnification for the cyan image is corrected. The correction for the magenta and yellow images is performed in a similar manner.

To place the phase-shift pixels at random or evenly, as described with reference to FIGS. 5 and 6, such pixel dispersion is taken place during a time period of the detections by the sensors 460 and 461.

Figure 25:
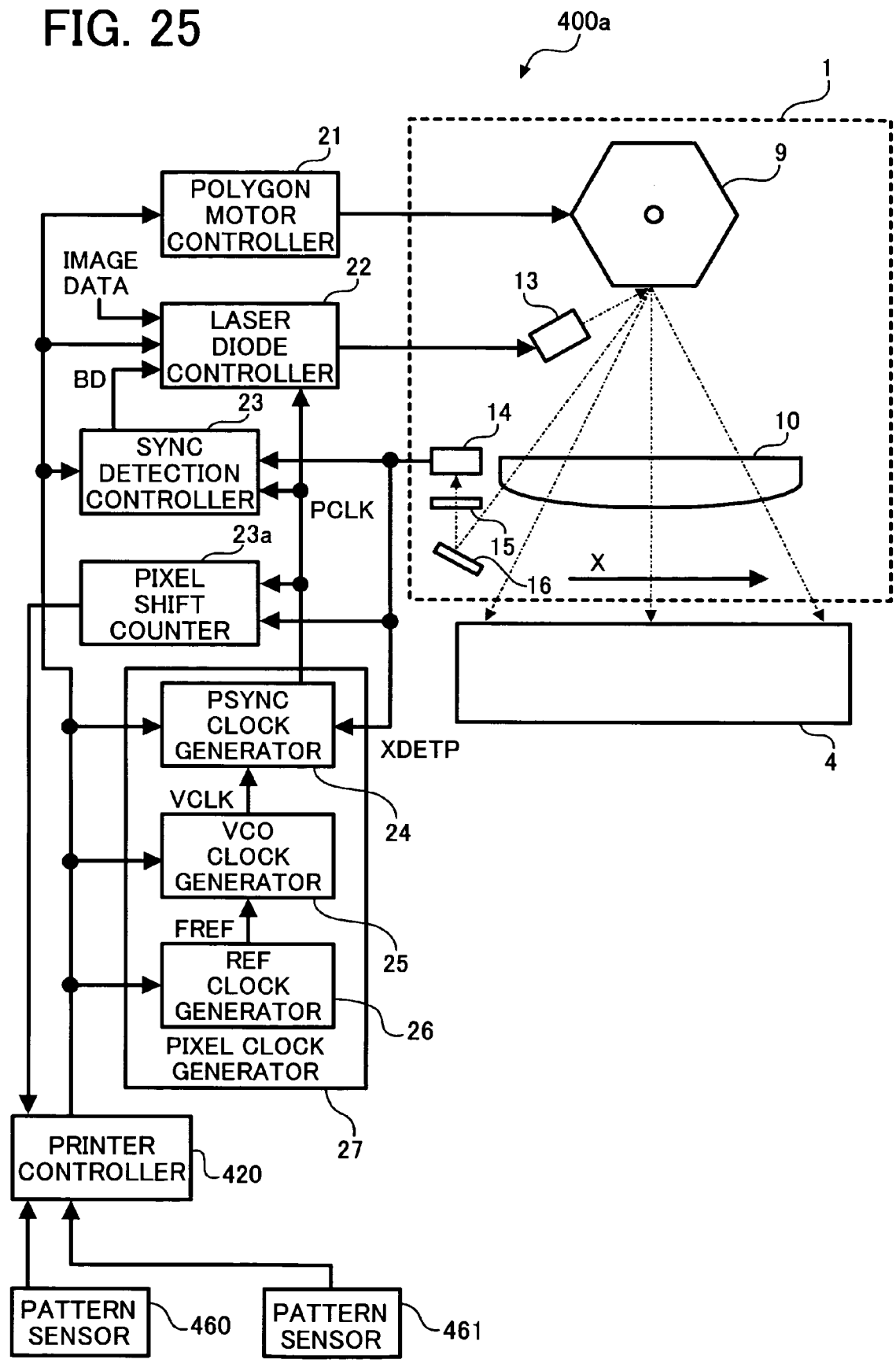
FIG. 25 is a block diagram of the modified apparatus of FIG. 23.

The clock controlling system of the color image forming apparatus 400a is shown in FIG. 25 which is based on the system of FIG. 2 with an addition of the pattern sensors 460 and 461 connected to the printer controller 420.

Figure 26:
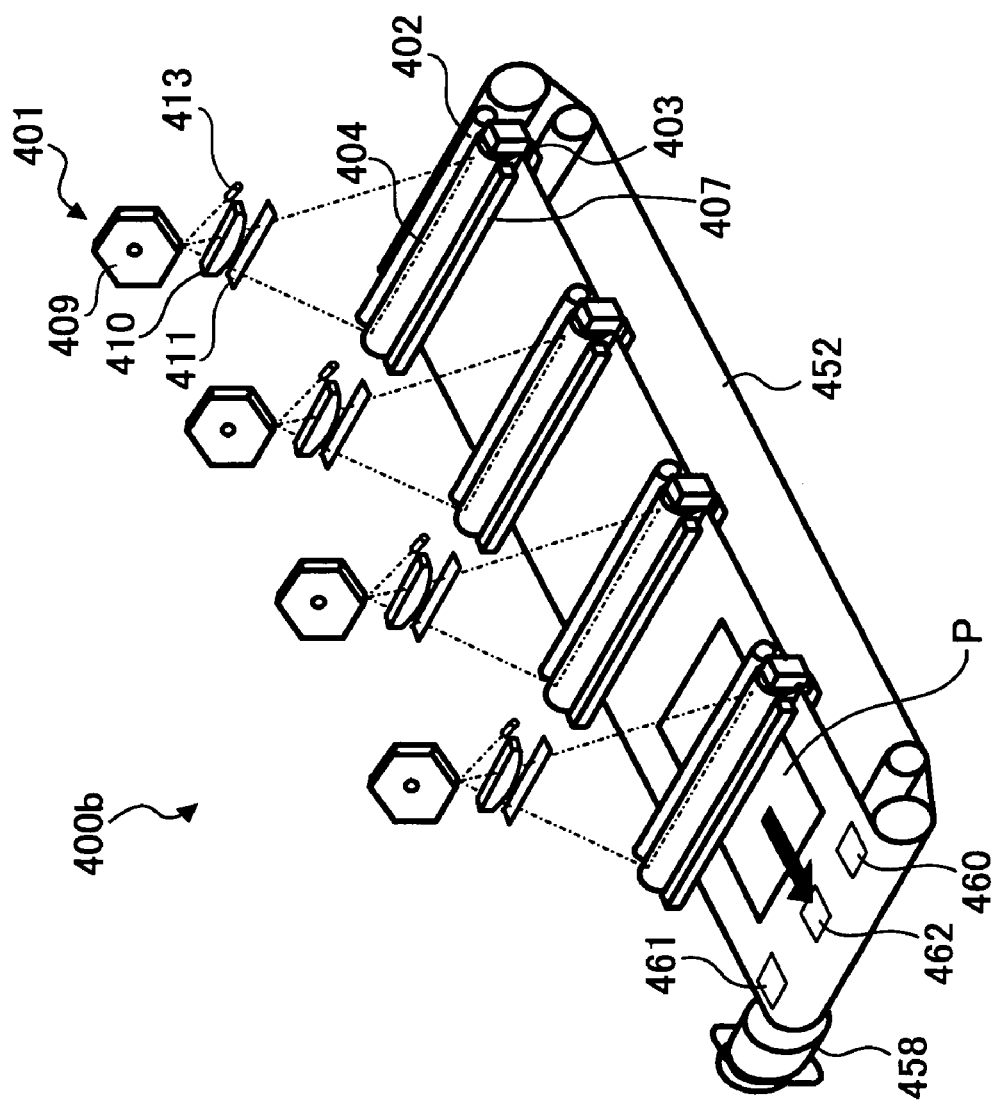
FIG. 26 is an illustration for explaining another modified apparatus based on the color image forming apparatus of FIG. 22.

Next, a color image forming apparatus 400b is explained with reference to FIGS. 26–28. The color image forming apparatus 400b of FIG. 26 is similar to the color image forming apparatus 400a of FIG. 23, except for a pattern sensor 462 which is also a reflection-type optical sensor and is disposed between the pattern sensors 460 and 461. With the three pattern sensors 460–462, the image magnification correction is performed relative to one half of the image in an area between the pattern sensors 460 and 462 and the other half of the image in an area between the pattern sensors 462 and 461.

Figure 27:
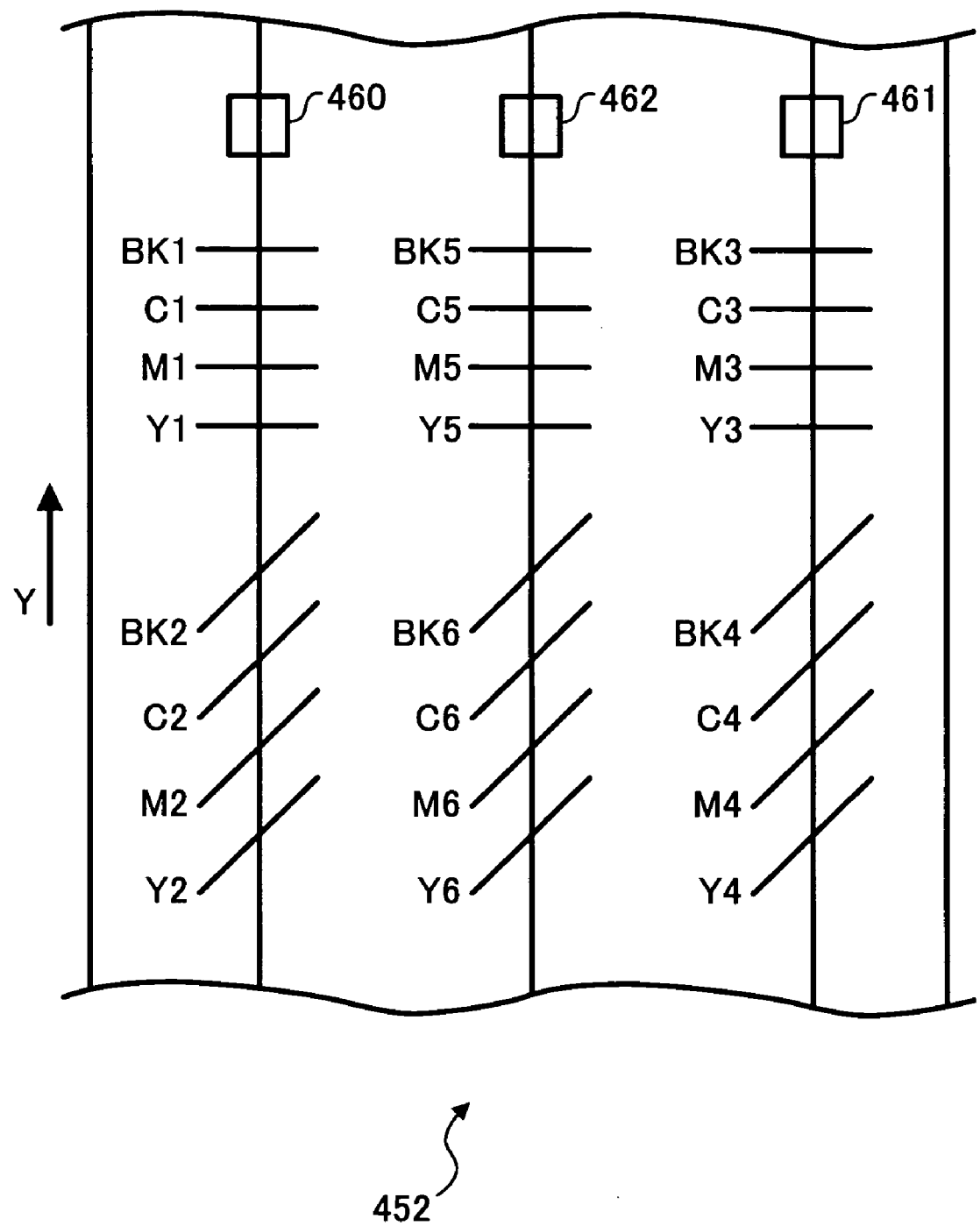
FIG. 27 is an illustration for explaining test pattern detectors provided to the modified apparatus of FIG. 26.

FIG. 27 shows one example of the position adjustment pattern. The position adjustment pattern is formed at a predetermined time on two edge surfaces (i.e., left and right edge surfaces in the drawing) and the center surface of the image transfer belt 452. The position adjustment pattern includes four color-dependent sub-patterns which are equally spaced in the sub-scanning direction, as shown in FIG. 27. A black sub-pattern includes six line segments BK1, BK2, BK3, BK4, BK5, and BK6. The line segments BK1, BK3, and BK5 are parallel to the main scanning direction and the line segments BK2, BK4, and BK6 are oblique to the main scanning direction. Likewise, a cyan sub-pattern includes six line segments C1, C2, C3, C4, C5, and C6, a magenta sub-pattern includes six line segments M1, M2, M3, M4, M5, and M6, and a yellow sub-pattern includes six line segments Y1, Y2, Y3, Y4, Y5, and Y6.

The image transfer belt 452 having the position adjustment pattern thereon is moved in the sub-scanning direction by its sub-scanning rotation, and the position adjustment pattern is caused to pass by the pattern sensors 460–462 so that the pattern sensors 460–462 read the position adjustment pattern. The pattern data read by the pattern sensors 460–462 are sent to a printer controller 420a (see FIG. 28). The printer controller 420a then calculates differences in position, i.e., time, between the black image and other color images. The oblique line segments are used for the correction of the image position and the image magnification in the main scanning direction, and the traverse line segments are used for the correction of the image position in the sub-scanning direction.

For a left-half of the cyan color image, for example, in the area between the pattern sensors 460 and 462 in the main scanning direction, the image magnification is corrected based on calculated time periods TBK12, TC12, TBK56, TC56, TBKC12, and TBKC56. The time period TBK12 is a time period from the detection of the line segment BK1 to the detection of the line segment BK2, the time period TC12 is from the line segment TC1 to the line segment TC2. Likewise, the time period TBK56 is a time period from the detection of the line segment BK5 to the detection of the line segment BK6, the time period TC56 is from the line segment TC5 to the line segment TC6. The time period TBKC12 is a time difference between the time periods TBK 12 and TC12, and time period TBKC56 is a time difference between the time periods TBK56 and TC56. An error amount of the image magnification for the left-half of the cyan image relative to the left-half of the black image is obtained by subtraction of the time period TBKC12 from the time period TBKC56. Accordingly, the phase of the pixel clock signal PCLK for the left-half of the cyan image is shifted by the above-described image magnification error amount. Thereby, the image magnification for the left-half of the cyan image is corrected.

Further, for a right-half of the cyan color image in the area between the pattern sensors 462 and 461 in the main scanning direction, the image magnification is corrected based on calculated time periods TBK56, TC56, TBK34, TC34, TBKC56, and TBKC34. The time period TBK56 is a time period from the detection of the line segment BK5 to the detection of the line segment BK6, the time period TC34 is from the line segment TC3 to the line segment TC4. Likewise, the time period TBK34 is a time period from the detection of the line segment BK3 to the detection of the line segment BK4, the time period TC34 is from the line segment TC3 to the line segment TC4. The time period TBKC56 is a time difference between the time periods TBK56 and TC56, and time period TBKC34 is a time difference between the time periods TBK34 and TC34. An error amount of the image magnification for the right-half of the cyan image relative to the right-half of the black image is obtained by subtraction of the time period TBKC56 from the time period TBKC34. Accordingly, the phase of the pixel clock signal PCLK for the right-half of the cyan image is shifted by the above-described image magnification error amount. Thereby, the image magnification for the right-half of the cyan image is corrected.

The correction for the magenta and yellow images is performed in a similar manner.

To place the phase-shift pixels at random or evenly, as described with reference to FIGS. 5 and 6, such pixel dispersion is taken place during a time period of the detections by the sensors 460 and 462 and during a time period of the detections by the sensors 462 and 461.

Figure 28:
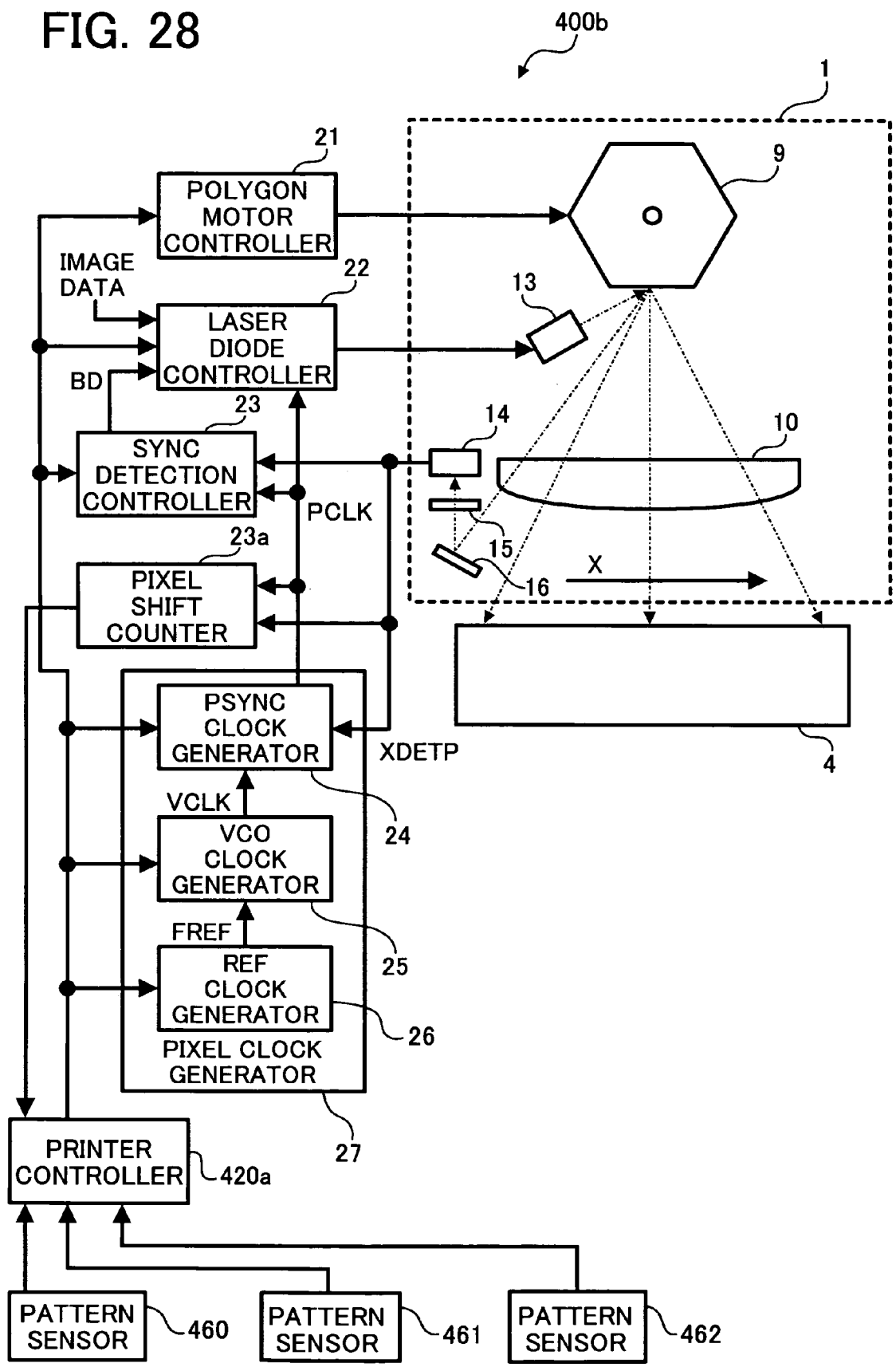
FIG. 28 is a block diagram of the modified apparatus of FIG. 26.

The clock controlling system of the color image forming apparatus 400b is shown in FIG. 28 which is based on the system of FIG. 25 with an addition of the pattern sensor 462 connected to the printer controller 420a.

Figure 29:
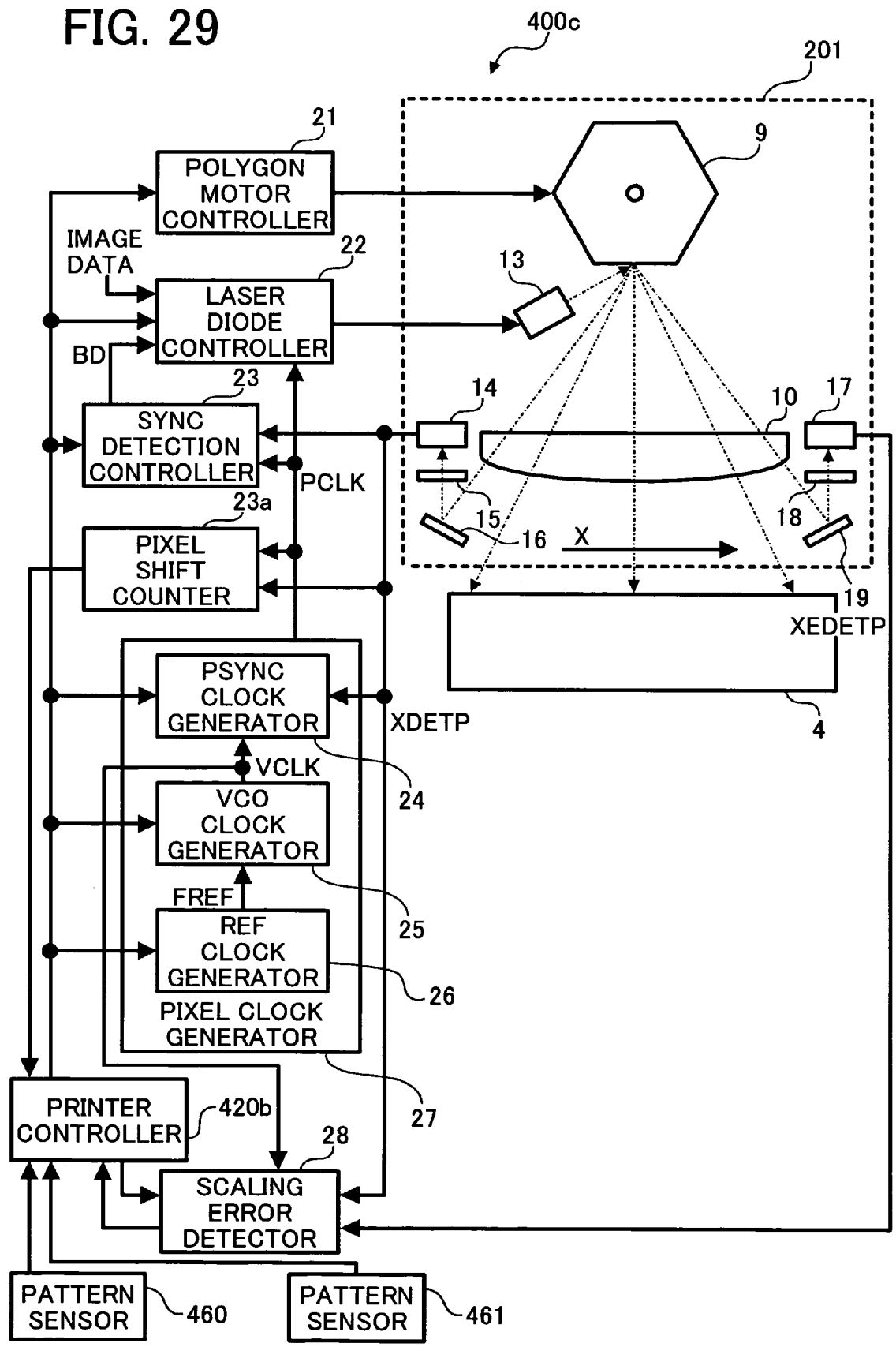
FIG. 29 is a block diagram of another modified apparatus based on the color image forming apparatus of FIG. 22.

FIG. 29 shows a clock controlling system of a color image forming apparatus 400c, which is made based on the clock controlling system of the color image forming apparatus 400a of FIG. 25 with an addition of the second sync detection mechanism described above with reference to FIG. 9. The color image forming apparatus 400s is capable of correcting the image magnification with the detection of the signals XDETP and XEDETP during the main scanning process and also with the detection of the pattern formed on the image transfer belt 452.

Figure 30:
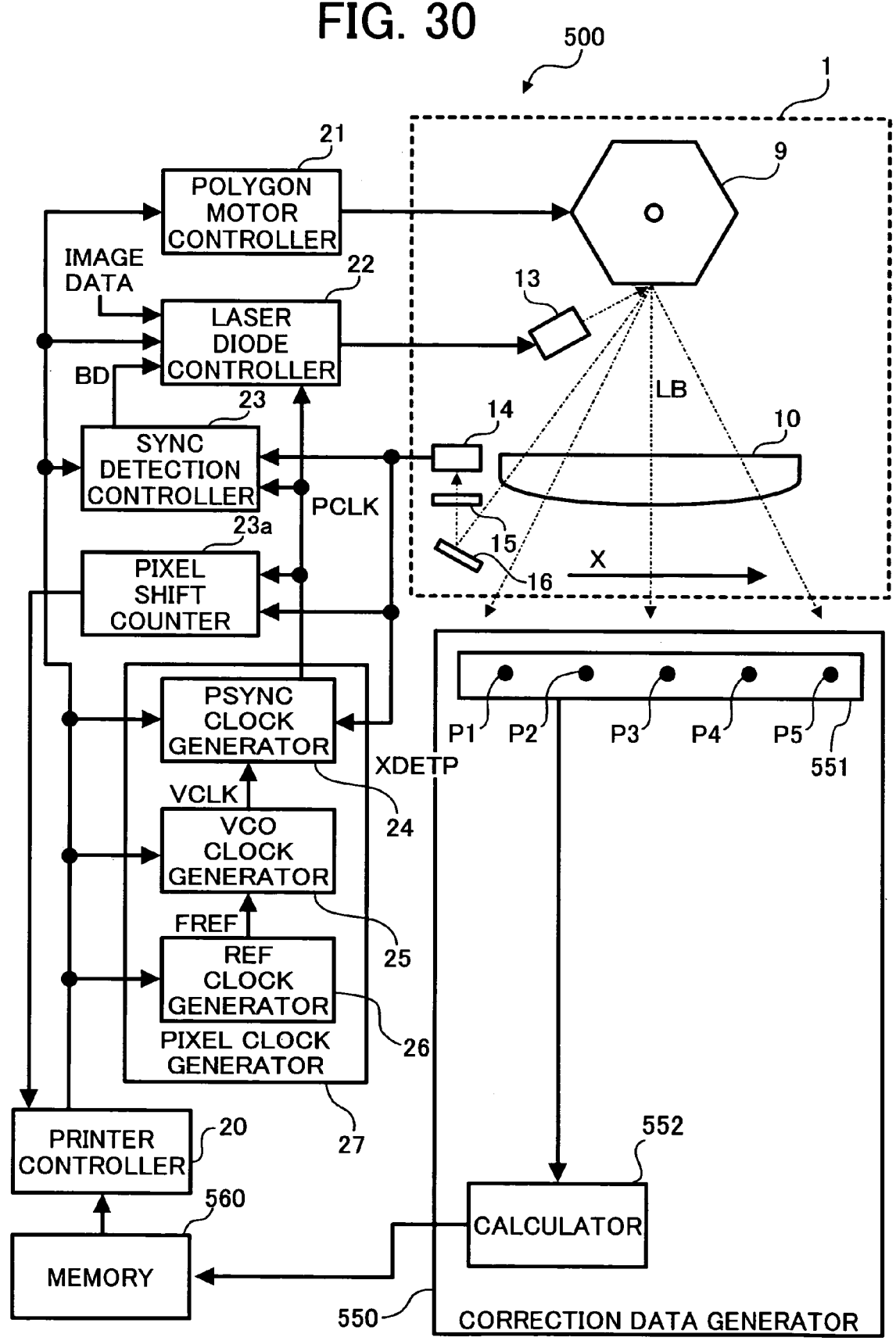
FIG. 30 is a block diagram of another image forming apparatus according to an exemplary embodiment of the present invention.

Next, an image forming apparatus 500 according to an exemplary embodiment of the present invention is explained with reference to FIG. 30. The image forming apparatus 500 of FIG. 30 is similar to the image forming apparatus 100 of FIG. 2, except for a correction data generator 550 and a memory 560. The correction data generator 550 generates correction data and sends the correction data to the memory 560 which is connected to the printer controller 20 to transmit the stored correction data to the printer controller 20. The correction data generator 550 includes a measuring tool 551 and a calculator 552.

The image forming apparatus 500 of FIG. 30 is configured to measure an error of image scaling by detecting the scanning laser beam LB, produced by the optical scanning unit 1 under the control of the clock controlling system, with the measuring tool 551 of the correction data generator 550. The calculator 552 of the correction data generator 550 calculates the detection data output from the measuring tool 551 to generate correction data. The correction data generated by the calculator 551 is sent to and is stored into the memory 560 and is used by the printer controller 20 on an as needed basis. In this example, the correction data generator 550 handles the correction data at five different measuring points P1–P5, as shown in FIG. 30, on the surface to be scanned by the laser beams LB in the main scanning direction. In this system, the scaling error is obtained by seeking a difference of scan time for the laser beam LB to run a distance of adjacent two points among the measuring points P1–P5 between a reference time and an actual time. For example, when the image portion between the measuring points P1 and P2 is expanded by one pixel, the correction data generator 550 generates the correction data for advancing the phase of the pixel by sixteen sixteenths of the pixel clock signal PCLK and sends it to the memory 560. For another example, when the image portion between the measuring points P2 and P3 is shrunk by a half pixel, the correction data generator 550 generates the correction data for delaying the phase of the pixel by eight sixteenths of the pixel clock signal PCLK and sends it to the memory 560.

Figure 31:
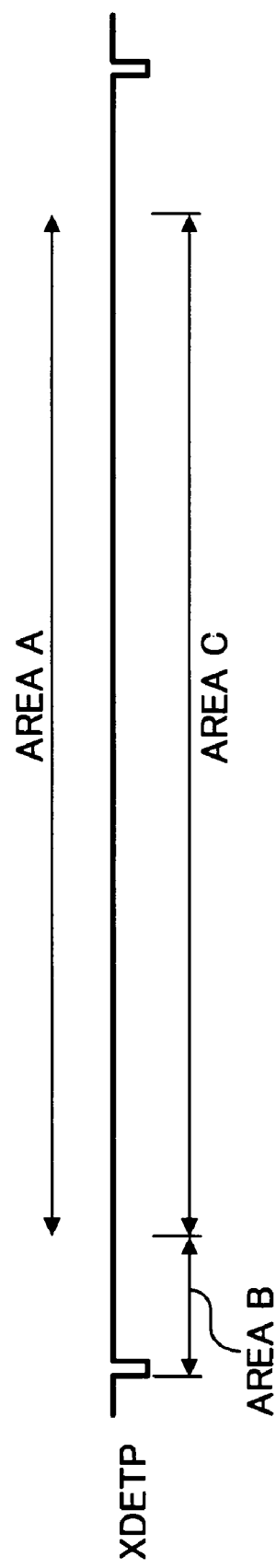
FIG. 31 is an illustration for explaining areas in a time between two signals XDETP.

FIG. 31 shows the start-sync detection signal XDETP and areas for the corrections of the image position and the image magnification. In FIG. 31, an area A is an effective image area. When the position of an entire image is shifted to an advanced or delayed position, the phase shift is arranged before the actual image. In other words, this phase shift is needed to be performed in an area B enclosed between the start-sync detection signal XDETP and the beginning of the area A. This area B is referred to as an image position correction area. Within this area B, the phase of the pixel clock signal PCLK is shifted based on the correction data stored in the memory 560. On the other hand, the image magnification is needed to be corrected by the clock phase shifting within an image area C where an image is effectively formed, that is, the image area C is equal to the image area A, and where the image scaling error actually occurs. The image area C may be referred to as an image magnification correction area.

Figure 32:
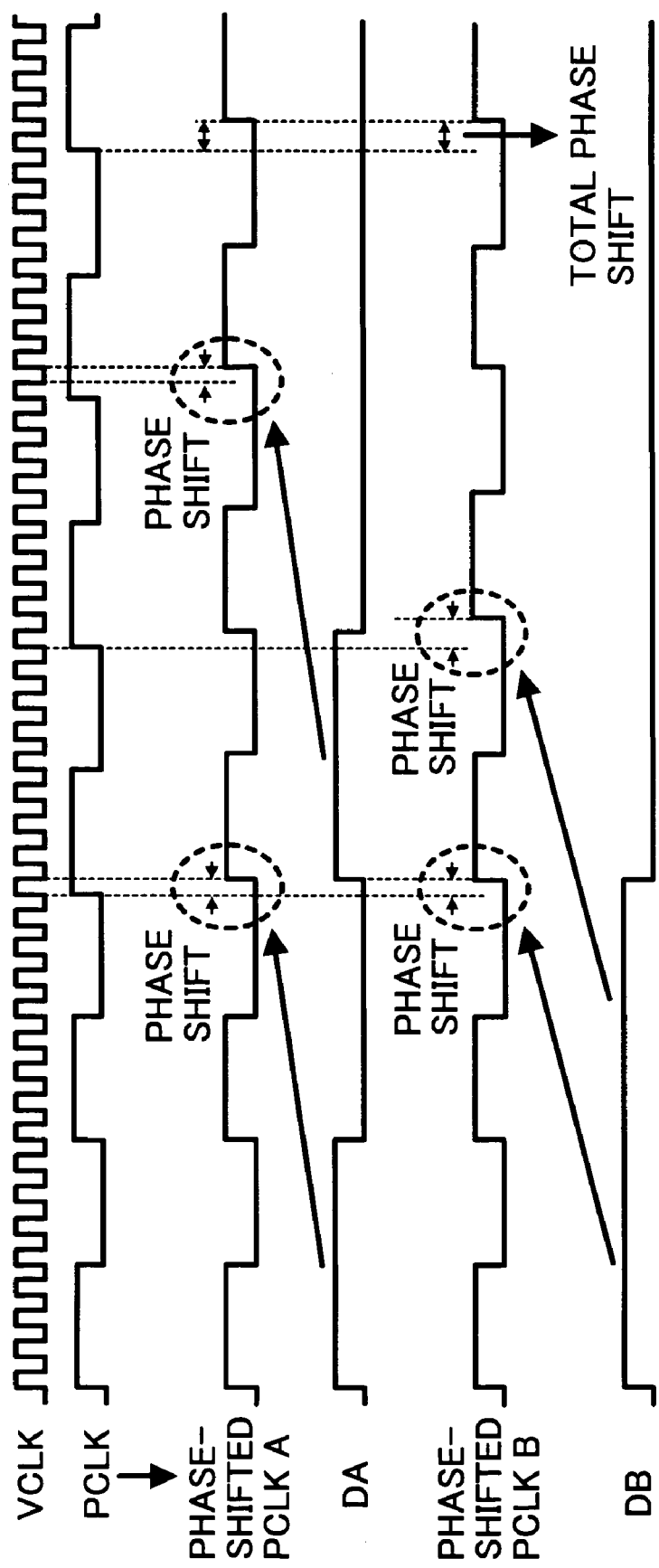
FIG. 32 is a time chart for explaining a cyclic phase shift and a continuous phase shift.

FIG. 32 demonstrates two different forms of the correction data generated by the image forming apparatus 500 for correcting the image position in the image position correction area (i.e., the area B). Although their forms are different, the two different forms of correction data achieve the same result of the phase shifting when they are the same in amount and direction of the phase shift. In FIG. 32, a lower bit of the correction data (e.g., one of "00b," "01b," and "10b") is shown and is represented as correction data DA and correction data DB. The correction data DA includes two delay phase shift bits with a non-phase-shift bit therebetween, while the correction data DB includes two connected delay phase shift bits. However, amounts of the total phase shifts in both cases are same, as shown in FIG. 32. One difference between these two types of correction data is information items necessary to generate the correction data. That is, to generate the correction data DA, it needs an amount of data (i.e., a number of the pixel clock signal PCLK to be phase-shifted), and a direction and a position of the phase shift. On the other hand, to generate the correction data DB, a position of the phase shift is not required since the data is continuous and therefore it needs only an amount of data (i.e., a number of pixel clock signal PCLK to be phase-shifted) and a position of the phase shift.

Figure 33:
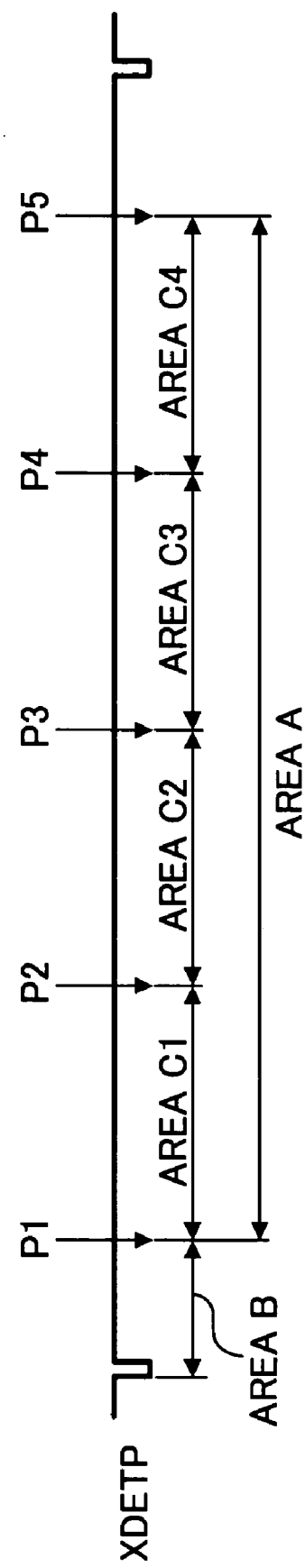
FIG. 33 is an illustration for explaining sub-division areas in an effective image area in a time between two signals XDETP.

FIG. 33 shows an exemplary division of the image magnification correction area (i.e., the image area C) into sub-image areas C1–C4 according to the measuring points P1–P5 of the measuring tool 551. This configuration allows for the generation of correction data for the image magnification correction in each of the sub-image areas C1–C4, and the image magnification correction is performed relative to each of the sub-image areas C1–C4.

As an alternative to the sub-image areas C1–C4, it is possible to divide the image area C into a greater number of sub-image areas. It is predictable that the division numbers of such sub-image areas are different between the cases of a black and white image forming apparatus and a color image forming apparatus, for example. Therefore, the division numbers may be arbitrarily instructed by users through an operation panel of the apparatus.

Figure 34:
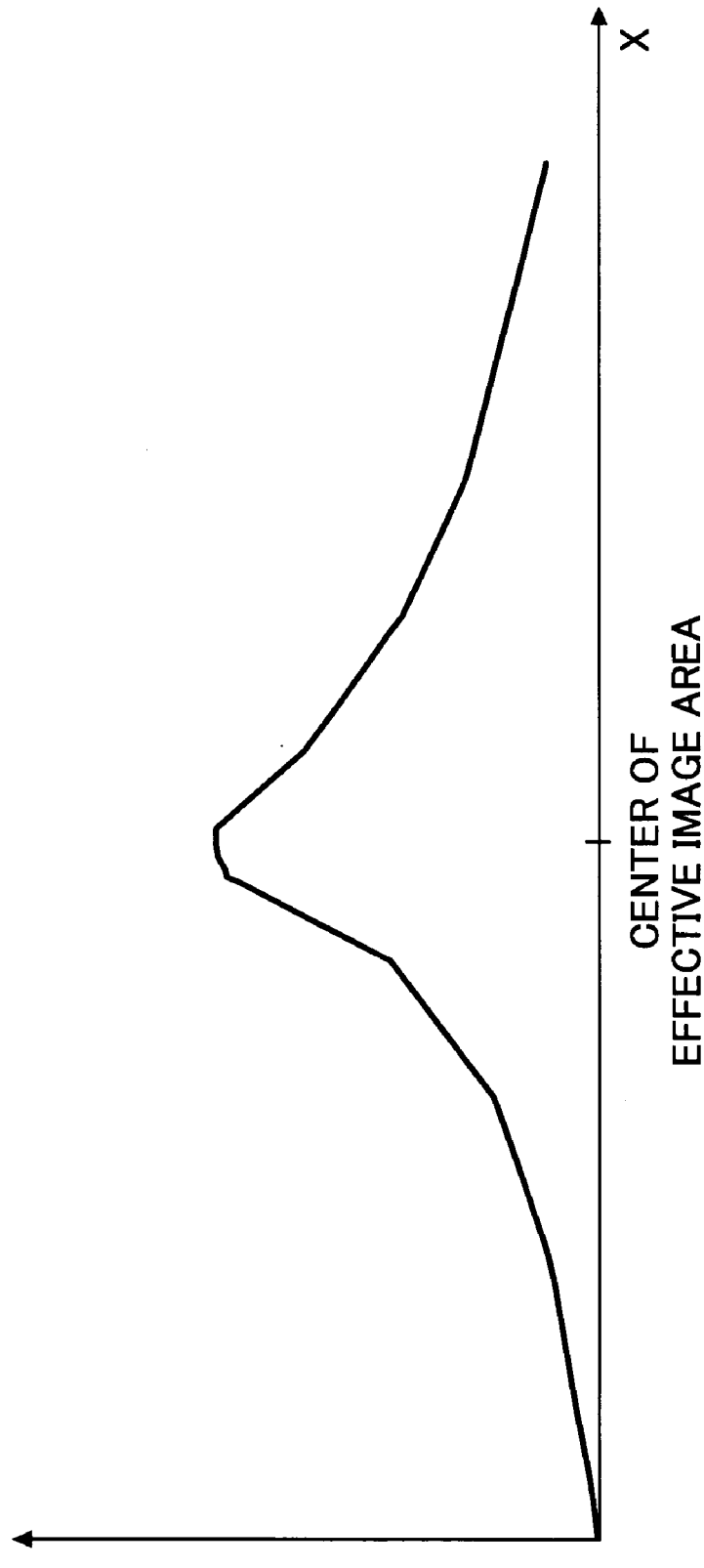
FIG. 34 is an illustration for explaining a distribution curve of an error in the image magnification in the main scanning direction.

FIG. 34 demonstrates an exemplary distribution of the image magnification error occurring in the image forming apparatus 500 in the main scanning direction. In this case, the error is greater around the center in the main scanning direction than areas towards both ends and its changes towards the both ends are relatively abrupt. When the measuring points are equally-spaced such as the measuring points P1–P5 of FIG. 33, the measurement accuracy differs in the center area and the sides close to the ends. The measurement accuracy for the area around the center, in particular, may be inferior. Accordingly, the correction of image magnification may not be performed properly around the center area. Therefore, to properly perform the image magnification correction around the center area, it is needed to shorten the distances between the measuring points in the center area. On the other hand, the distances between the measuring points in the side areas where the changes of the curve is not abrupt and plane can be elongated without causing a great change in the error curve.

Figure 35:
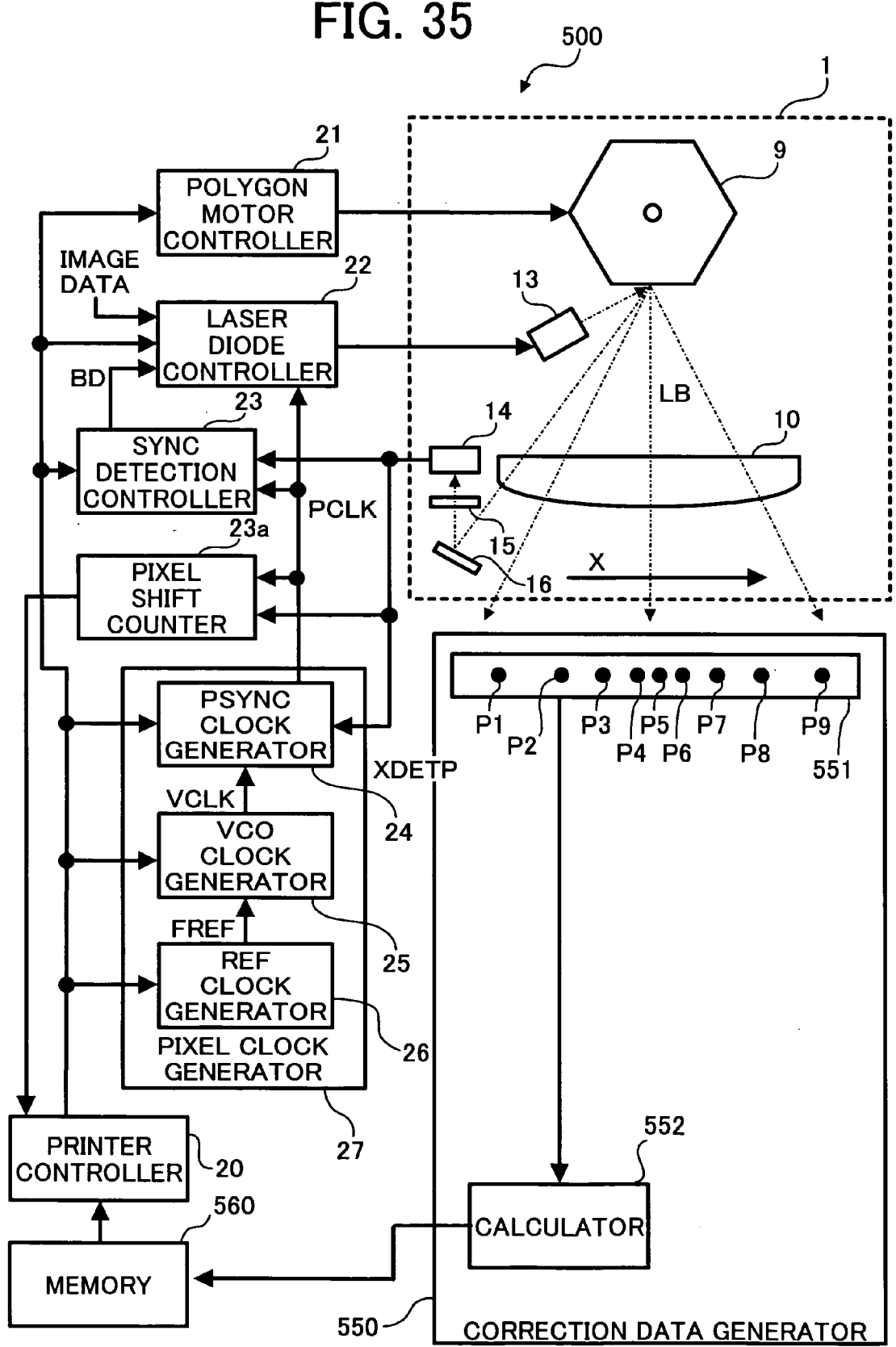
FIG. 35 is the block diagram of the image forming apparatus of FIG. 30 with different detection points.
Figure 36:
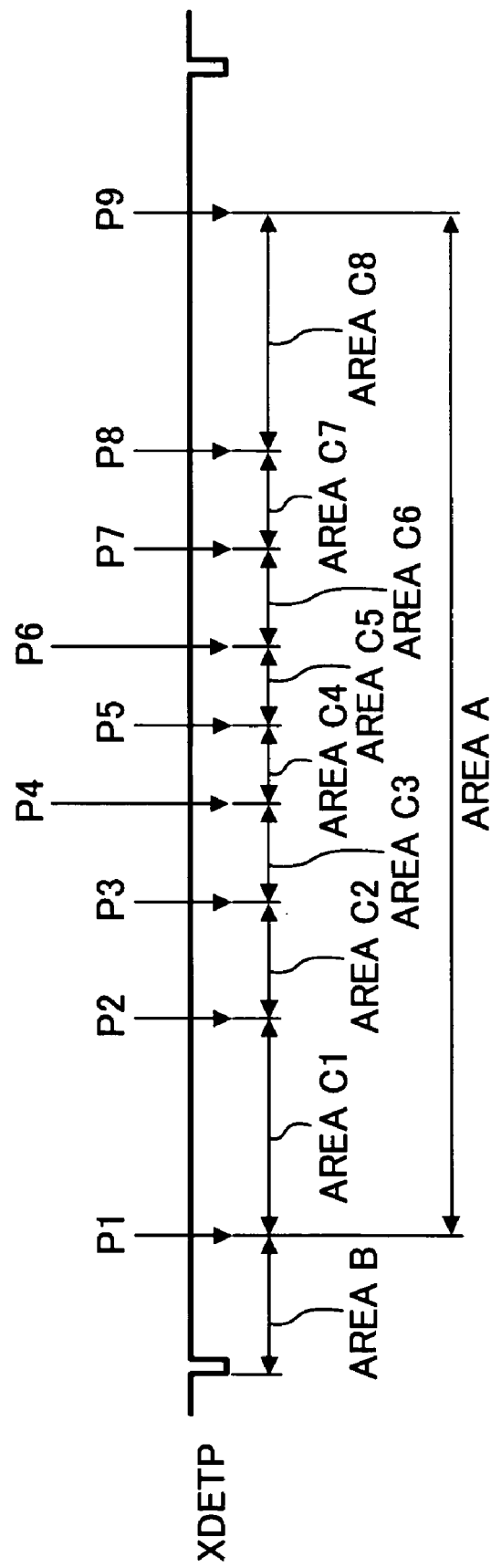
FIG. 36 is an illustration for explaining different sub-division areas in an effective image area in a time between two signals XDETP.

As shown in FIG. 35, it is possible to provide the image forming apparatus 500 with an increased number of the measuring points to be measured by the measuring tool 551 of the correction data generator 550. This example is provided with measuring points P1–P9 with different spaces such that points are narrowly spaced in the center area and points are widely spaced in areas towards both ends. That is, as shown in FIG. 36, the image area C is divided into sub-image areas C1–C8. This configuration allows for the generation of correction data more accurately for the image magnification correction in each of the sub-image areas C1–C8, and the image magnification correction is performed more accurately relative to each of the sub-image areas C1–C8.

Figure 37:
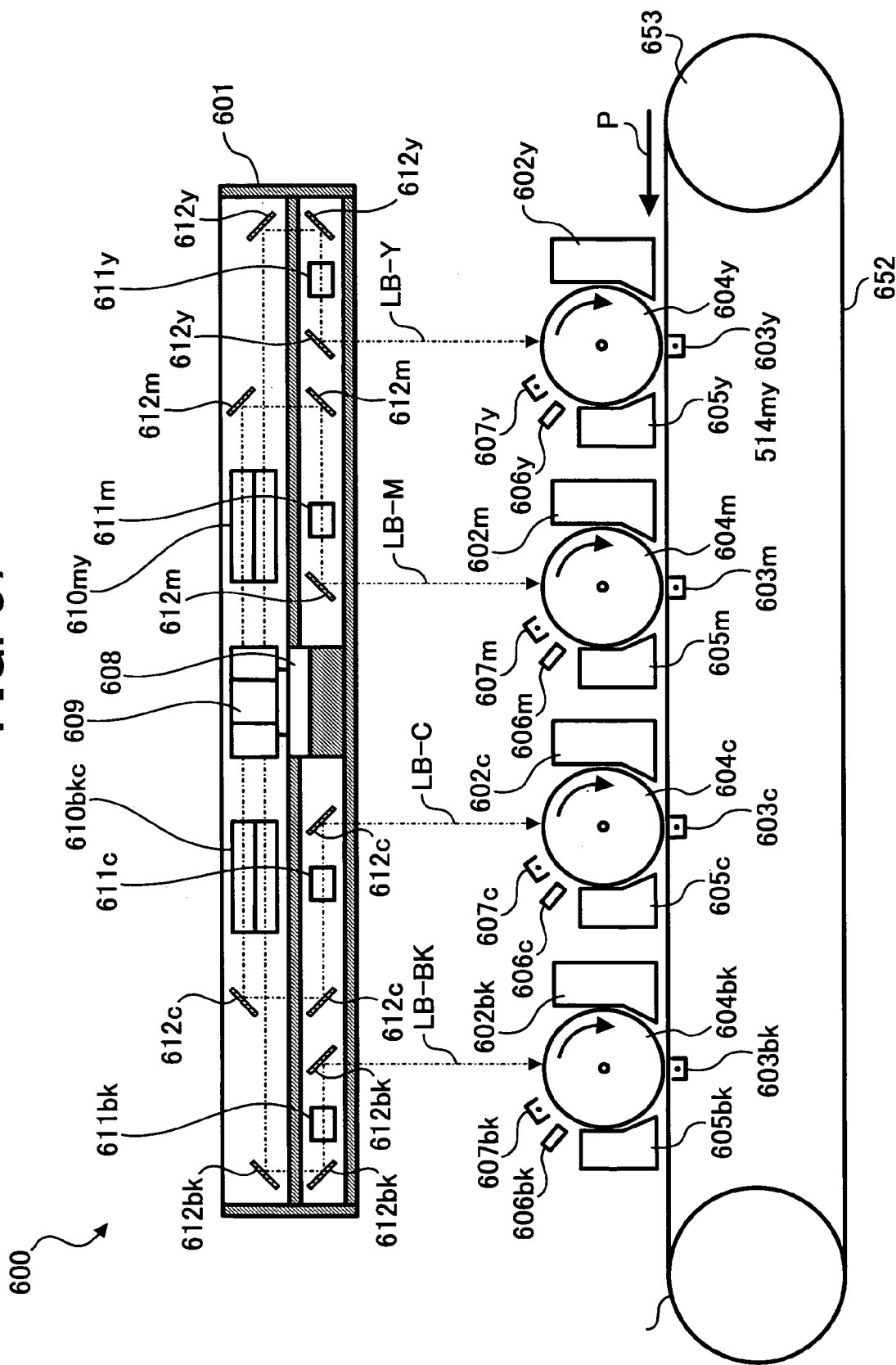
FIGS. 37 and 38 are illustrations for explaining another color image forming apparatus according to another embodiment of the present invention.

Another example of the color image forming apparatus that performs the image magnification correction is a color image forming apparatus 600 shown in FIG. 37, also using the electrophotographic process. This color image forming apparatus 600 of FIG. 37 is provided with a complex optical scanning unit 601 for producing four independent laser beams by a single optical unit.

As shown in FIG. 37, this optical scanning unit 601 includes one driving motor (i.e., a polygon motor 608), a polygon mirror (i.e., a polygon mirror 609), two fθ lenses (i.e., fθ lenses 610BKC and 610MY), and four optical component sets. One of the four optical component sets is a set for producing a black laser beam LB-BK, including a barrel toroidal lens (BTL) 611BK and three mirrors 612BK. Another one of the four optical component sets is a set for producing a cyan laser beam LB-C, including a barrel toroidal lens (BTL) 611C and three mirrors 612C. Another one of the four optical component sets is a set for producing a magenta laser beam LB-M, including a barrel toroidal lens (BTL) 611M and three mirrors 612M. Another one of the four optical component sets is a set for producing a yellow laser beam LB-Y, including a barrel toroidal lens (BTL) 511Y and three mirrors 612Y.

The color image forming apparatus 600 is further provided with four sets of the clock controlling system similar to that described with reference to FIG. 2 to control the clock signals for the laser beams BK, C, M, and Y. The color image forming apparatus 600 is further provided with corresponding four image forming mechanism sets. One of the four image forming mechanism sets for the black laser beam LB-BK includes a development unit 602BK, an image transfer unit 603BK, a photoconductive drum 604BK, a cleaning unit 605BK, a discharging unit 606BK, and a charging unit 607BK. Another one of the four image forming mechanism sets for the cyan laser beam LB-C includes a development unit 602C, an image transfer unit 603C, a photoconductive drum 604C, a cleaning unit 605C, a discharging unit 606C, and a charging unit 607C. Another one of the four image forming mechanism sets for the magenta laser beam LB-M includes a development unit 602M, an image transfer unit 603M, a photoconductive drum 604M, a cleaning unit 605M, a discharging unit 606M, and a charging unit 607M. Another one of the four image forming mechanism sets for the yellow laser beam LB-Y includes a development unit 602Y, an image transfer unit 603Y, a photoconductive drum 604Y, a cleaning unit 605Y, a discharging unit 606Y, and a charging unit 607Y.

The color image forming apparatus 600 is further provided with an image transfer belt 652, a driving roller 653, and a supporting roller 654.

The image transfer belt 652 is extended with tension between the driving roller 653 and the supporting roller 654, and the image transfer units 603BK, 603C, 603M, and 603Y are arranged inside the image transfer belt 652 to face the photoconductive drums 604BK, 604C, 604M, and 604Y, respectively, relative to the image transfer belt 652. The recording sheet P is transported in a direction from right to left in the drawing to receive in turn the color toner images in colors of yellow, magenta, cyan, and black at the same position. As a result, the four color toner images are overlaid into a multi-layered color toner image onto the recording sheet P.

Figure 38:
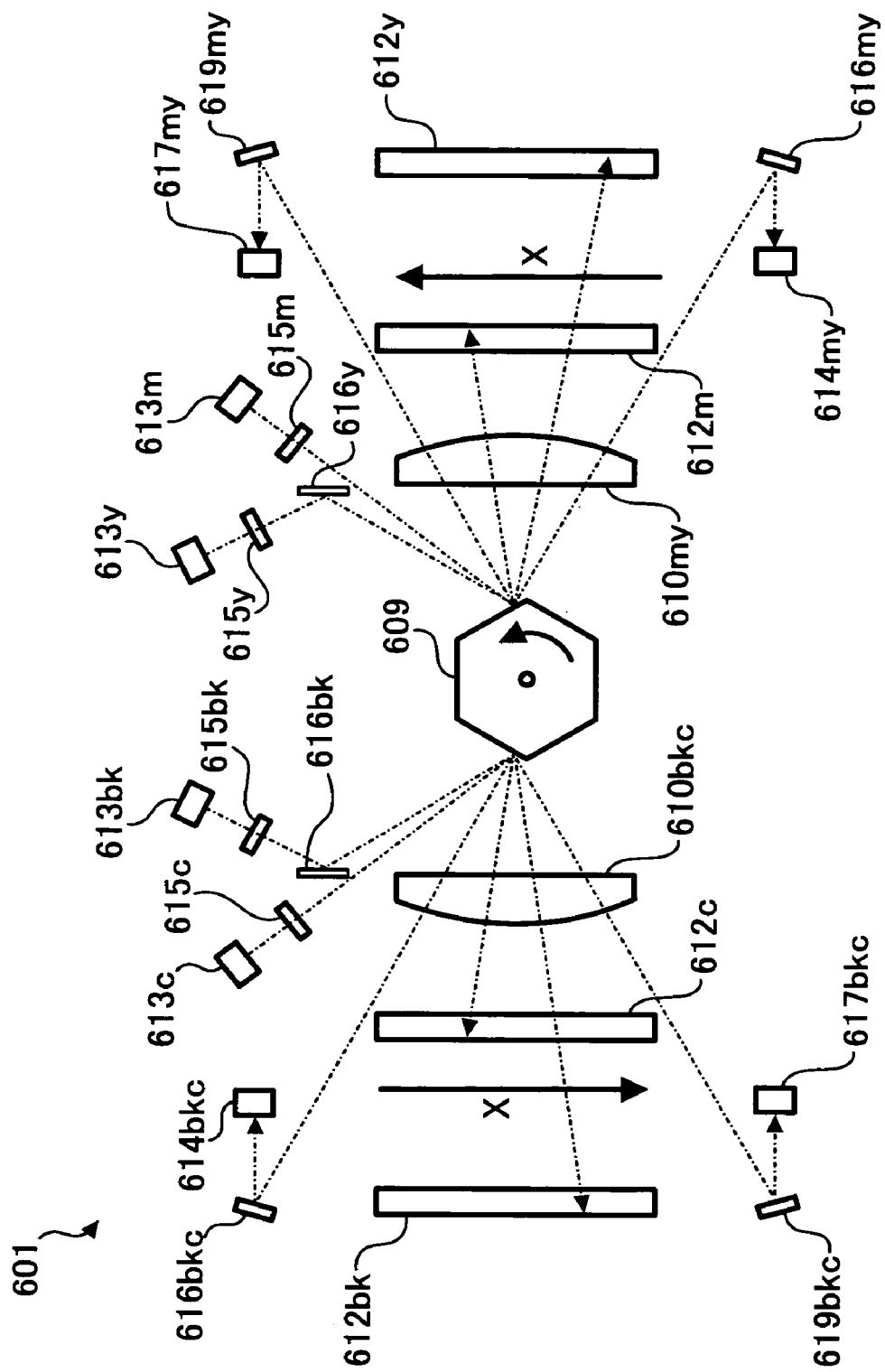

In this example, upper and lower portions of the polygon mirror 609 are separately used for the black and cyan laser beams LB-BK and LB-C and for the magenta and yellow laser beams LB-M and LB-Y. The deflection of these laser beams by the polygon mirror 609 is arranged in a way as illustrated in FIG. 38, which is a top view of the optical scanning unit 601 with indications of the respective laser beam passages. For example, the black laser beam BL-BK is emitted by a laser diode (LD) unit 613BK, passes through a cylinder lens 615BK, and is then deflected by a mirror 616BK toward the lower portion of the polygon mirror 609. Then, the black laser beam LB-BK is deflected by the polygon mirror 609, passes through the fθ lens 610BKC, and is deflected respectively by the mirrors 612BKC (two of the mirrors 512BKC are not shown in FIG. 38) towards the photoconductive drum 604.

The color image forming apparatus 600 has first and second sync detection mechanisms for the black and cyan laser beams LB-BK and LB-C and another set of first and second sync detection mechanisms for the magenta and yellow laser beams LB-M and LB-Y. The first sync detection mechanism of the black and cyan laser beam LB-BK and LB-C includes a cylinder mirror 616BKC and a beam sync sensor 614BKC. The second sync detection mechanism of the black and cyan laser beam LB-BK and LB-C includes a cylinder mirror 619BKC and a beam sync sensor 617BKC. Likewise, the first sync detection mechanism of the magenta and yellow laser beam LB-M and LB-Y includes a cylinder mirror 616MY and a beam sync sensor 614MY. The second sync detection mechanism of the magenta and yellow laser beam LB-M and LB-Y includes a cylinder mirror 619MY and a beam sync sensor 617MY.

When the black laser beam LB-BK, for example, starts to scan, the beam passing through the fθ lens 610BKC is deflected by the cylinder mirror 616BKC and is detected as the start-sync detection signal XDETP by the beam sync sensor 614BKC. The scanning of this black laser beam LB-BK is performed in the main scanning direction X and, at the end of scanning, the beam passing through the fθ lens 610BKC is deflected by the cylinder mirror 619BKC and is detected as the end-sync detection signal XEDETP by the beam sync sensor 617BKC. The cyan laser beam LB-C is detected in a similar manner as the start-sync detection signal XDETP by the beam sync sensor 614BKC and as the end-sync detection signal XEDETP by the beam sync sensor 617BKC.

In order to secure the respective sync detections by the common sensor at each of the start and end sides, incident timings of the black and cyan laser beams LB-BK and LB-C are arranged to differ from each other. It is of course possible, as an alternative, to provide a sensor for each of the laser beams.

In the opposite side relative to the polygon mirror 609, the magenta and yellow laser beams LB-M and LB-Y are detected through similar passages as the respective start-sync detection signals XDETP by the beam sync sensor 614MY and as the respective end-sync detection signals XEDETP by the beam sync sensor 617MY. The scanning direction of the magenta and yellow laser beams LB-M and LB-Y is, as shown in FIG. 38, reversed relative to the scanning direction of the black and cyan laser beams LB-BK and LB-C due to the rotation direction of the common polygon mirror 609.

In the above-described structure where a sync detection sensor (e.g., the start-sync detection sensor 614BKC) is commonly used for two laser beams (e.g., the black and cyan laser beams LB-BK and LB-C), a signal separation circuit for separating the two laser beams needs to be added to an output side of the sync detection sensor. This signal separation signal outputs and transmits separated signals to the respective color-dependent clock control circuits (see FIG. 9).

In a case that a sync detection sensor is prepared for each color, the clock controlling circuit of FIG. 9 is applied to each color.

In the structure of the color image forming apparatus 600, the main scanning directions for the two laser beam combinations are opposite, as described above. Therefore, a change of the image magnification to correct the image magnification of the black scanning line, for example, directly causes a displacement of the magenta and yellow images in the main scanning direction.

When the image magnification for the cyan scanning line is applied with the same amount of change in the image magnification for the black scanning line, no displacement of the cyan image will occur relative to the black image.

In other words, in the structure of the color image forming apparatus 600, an accuracy of the image magnification correction directly affects an accuracy of the positional correction in the main scanning direction.

In this way, the color image forming apparatus 600 has the four optical scanning units 601 and the corresponding clock controlling systems independently performing the optical writing operations and the image magnification corrections for the respective color systems. As one exemplary way, it is possible to set the image magnification correction for one of the four images such as the black color image, for example, as a reference correction, and the corrections of the remaining images are carried out based on such reference correction.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent applications, No. JPAP2003-015357 filed on Jan. 23, 2003, No. JPAP2003-044912 filed on Feb. 21, 2003, No. JPAP2003-065686 filed on Mar. 11, 2003, and No. JPAP2003-428226 filed on Dec. 12, 2003, in the Japanese Patent Office, the entire contents of which are incorporated by reference herein.

What is claimed is:

1. An optical recording apparatus for use in a color image forming apparatus, comprising:
    a light source which sequentially emits a plurality of light beams corresponding to basic color elements of a full color image;
    a scanning mechanism configured to independently reform the plurality of light beams emitted by the light source into respective cyclic scanning light beams to sequentially scan in a main scanning direction a photosensitive surface moving in a sub-scanning direction; and
    a phase shift controlling mechanism configured to perform an image magnification correction by a phase change for changing a phase of pixel clock signal in units of one nth of a cycle of the pixel clock signal at one or more positions on the photoconductive surface in the main scanning direction, n being an integer greater than one, and the pixel clock signals being used for a control of the light source to turn on and off each of the cyclic scanning light beams in accordance with each of the basic color elements of the full color image,
    wherein the scanning mechanism comprises at least one light deflecting mechanism, each comprising a plurality of light deflecting surfaces configured to move to deflect each one of the plurality of light beams emitted by the light source to reform it into corresponding one of the respective cyclic scanning light beams, and the detecting mechanism performs the beam detection per each of the plurality of light deflecting surfaces and the time measuring mechanism performs the time measurement per each of the plurality of light deflecting surfaces, and the phase shift controlling mechanism performs the image magnification correction based on the time measurement performed per each of the plurality of light deflecting surfaces by the time measuring mechanism, and
    wherein a time measurement on a specific light deflecting surface out of the plurality of light deflecting surfaces performed by the time measuring mechanism is regarded as a reference time measurement, and the phase shift controlling mechanism performs the image magnification correction with respect to each one of other light deflecting surfaces than the specific light deflecting surface out of the plurality of light deflecting surfaces based on a difference of a corresponding time measurement from the reference time measurement.

2. An optical recording apparatus according to claim 1, wherein the phase shift controlling mechanism performs the image magnification correction based on a signal representing an image deviation in the main scanning direction transmitted from the image forming apparatus.

3. The optical recording apparatus according to claim 1, further comprising:
    a detecting mechanism configured to perform a beam detection for independently detecting the respective cyclic scanning light beams reformed into by the scanning mechanism at two detecting positions on the photosensitive surface; and
    a time measuring mechanism configured to perform a time measurement for measuring for each of the respective cyclic scanning light beams a time difference between detection results at the two detecting positions by the detecting mechanism,
    wherein the phase shift controlling mechanism performs the image magnification correction based on the time difference measured by the time measuring mechanism.

4. The optical recording apparatus according to claim 1, wherein the phase shift controlling mechanism performs the image magnification correction based on the time difference measured by the time measuring mechanism and a signal representing an image deviation in the main scanning direction transmitted from the image forming apparatus.

5. The optical recording apparatus according to claim 1, further comprising:
    a pixel clock frequency controlling mechanism configured to change a frequency of the pixel clock signals in steps of a predetermined frequency value to perform the image magnification correction in collaboration with the phase shift controlling mechanism.

6. The optical recording apparatus according to claim 5, wherein the phase shift controlling mechanism performs a portion of the image magnification correction smaller than the predetermined frequency value.

7. The optical recording apparatus according to claim 5, wherein the correcting means performs a portion of the image magnification correction smaller than the predetermined frequency value.

8. The optical recording apparatus according to claim 1, wherein the beam detection by the detecting mechanism and the time measurement by the time measuring mechanism are carried out when the plurality of light deflecting surfaces is restarted after being stopped from moving or changed to move at a different moving rate.

9. The optical recording apparatus according to claim 1, wherein the beam detection by the detecting mechanism and the time measurement by the time measuring mechanism are carried out when the light source is again activated after being inactivated and emitting no light beam.

10. The optical recording apparatus according to claim 1, wherein the time measurement and the image magnification correction are performed in a cyclic manner by the time measuring mechanism and the phase shift controlling mechanism, respectively, during one of an image forming process and when the plurality of light deflecting surfaces are moving in a steady state to emit the plurality of light beams.

11. The optical recording apparatus according to claim 10, wherein a cycle of the time measurement performed by the time measuring mechanism is changeable.

12. The optical recording apparatus according to claim 10, wherein a cycle of the time measurement performed by the carrying means is changeable.

13. The optical recording apparatus according to claim 1, wherein one of the two detecting positions for the detecting mechanism is located close to a starting edge of an effective image area and a different one of the two detecting positions is located close to an ending edge of the two ends of the effective image area.

14. The optical recording apparatus according to claim 1, further comprising:
an image forming controller configured to determine the positions, at which the phase change is performed by the phase shift controlling mechanism, randomly or evenly within an effective image area.

15. The optical recording apparatus according to claim 14, further comprises:
a beam detector configured to perform a beam detection for independently detecting the respective cyclic scanning light beams reformed into by the scanning mechanism at two beam-detecting positions on the photosensitive surface; and
a time measuring mechanism configured to perform a time measurement for measuring for each of the respective cyclic scanning light beams a time difference between detection results at the two beam-detecting positions by the beam detector,
wherein the phase shift controlling mechanism performs the image magnification correction based on the time difference measured by the time measuring mechanism, and
wherein the image forming controller determines the positions, at which the phase change is performed by the phase shift controlling mechanism, randomly or evenly within an area between the two beam-detecting positions.

16. The optical recording apparatus according to claim 15, further comprising:
a test pattern detector configured to perform a test pattern detection for detecting at two or more pattern-detecting positions a test color pattern and to generate a signal representing an image deviation in the main scanning direction,
wherein the phase shift controlling mechanism performs the image magnification correction based on the signal transmitted from the test pattern detector.

17. The optical recording apparatus according to claim 16, wherein the image forming controller performs a position determination for determining the positions, at which the phase change is performed by the phase shift controlling mechanism, randomly or evenly within an area between the two beam-detecting positions when the phase shift controlling mechanism performs the image magnification correction based on the time difference measured by the time measuring mechanism and within an area between the pattern-detecting positions when the phase shift controlling mechanism performs the image magnification correction based on the signal transmitted from the test pattern detector.

18. The optical recording apparatus according to claim 17, wherein the image forming controller changes the position determination per scanning line to be not aligned in the sub-scanning line.

19. The optical recording apparatus according to claim 14, wherein the phase shift controlling mechanism performs the phase change to carry out an image position correction outside the effective image area and the image magnification correction within the effective image area, and the image forming controller recognizes the effective image area, determines an image forming area including the effective image area in the main scanning direction, and divides the image forming area into a first area in which the phase change is performed for the image position correction and a second area in which the phase change is performed for the image magnification correction.

20. The optical recording apparatus according to claim 19, wherein the first area is an area outside the effective image area and for starting an image recording.

21. The optical recording apparatus according to claim 20, wherein the phase shift controlling mechanism continuously performs the phase change when changing on a plurality of pixel clock signals.

22. The optical recording apparatus according to claim 19, wherein the image forming controller divides the second area into a plurality of sub-division areas, and the phase shift controlling mechanism performs the image magnification correction by the phase change in each of the plurality of sub-division areas independently.

23. The optical recording apparatus according to claim 22, wherein the image forming controller changes a width of each of the plurality of sub-division areas while maintaining an entire width of the second area.

24. The optical recording apparatus according to claim 22, wherein widths of the plurality of the sub-division areas are equal to each other.

25. The optical recording apparatus according to claim 22, wherein the image forming controller changes a number of the sub-division areas.

26. The optical recording apparatus according to claim 22, wherein the image forming controller changes one of widths of the plurality of sub-division areas and a number of sub-division areas of the second area according to a characteristic of the image magnification.

27. The optical recording apparatus according to claim 19, wherein the image forming controller performs a position determination for determining the positions, at which the phase change is performed by the phase shift controlling mechanism, randomly or evenly within the second area.

28. The optical recording apparatus according to claim 27, wherein the image forming controller changes the position determination per scanning line to be not aligned in the sub-scanning line.

29. An optical recording apparatus according to claim 1, wherein the correcting means performs the image magnification correction based on a signal representing an image deviation in the main scanning direction transmitted from the image forming apparatus.

30. The optical recording apparatus according to claim 1, further comprising:
   executing means for executing a beam detection for independently detecting the respective cyclic scanning light beams reformed into by the reforming means at two detecting positions on the photosensitive surface; and
   carrying means for carrying out a time measurement for measuring for each of the respective cyclic scanning light beams a time difference between detection results at the two detecting positions by the executing means,
   wherein the correcting means performs the image magnification correction based on the time difference measured by the time carrying means.

31. The optical recording apparatus according to claim 1, wherein the correcting means performs the image magnification correction based on the time difference measured by the carrying means and a signal representing an image deviation in the main scanning direction transmitted from the image forming apparatus.

32. The optical recording apparatus according to claim 1, further comprising:
   changing means for changing a frequency of the pixel clock signals in steps of a predetermined frequency value to perform the image magnification correction in collaboration with the correcting means.

33. The optical recording apparatus according to claim 1, wherein the beam detection by the executing means and the time measurement by the carrying means are carried out when the plurality of light deflecting surfaces is restarted after being stopped to move or changed to move at a different moving rate.

34. The optical recording apparatus according to claim 1, wherein the beam detection by the executing means and the time measurement by the carrying means are carried out when the light source is again activated after being inactivated and emitting no light beam.

35. The optical recording apparatus according to claim 1, wherein the time measurement and the image magnification correction are performed in a cyclic manner by the carrying means and the correcting means, respectively, during one of times an image forming process and when the plurality of light deflecting surfaces are moving in a steady state to emit the plurality of light beams.

36. The optical recording apparatus according to claim 1, wherein one of the two detecting positions for the executing means is located close to a starting edge of an effective image area and a different one of the two detecting positions is located close to an ending edge of the two ends of the effective image area.

37. An optical recording method for use in a color image forming apparatus, comprising the steps of:
   generating a pixel clock signal;
   emitting sequentially a plurality of light beams with a scanning mechanism in accordance with basic color elements of a full color image in steps of the pixel clock signal;
   reforming the plurality of light beams independently into respective cyclic scanning light beams to sequentially scan in a main scanning direction a photosensitive surface of the image forming apparatus moving in a sub-scanning direction;
   performing an image magnification correction by a phase change for changing a phase of pixel clock signal in units of one nth of a cycle of the pixel clock signal at one or more positions on the photoconductive surface in the main scanning direction, n being an integer greater than one;
   executing a beam detection for independently detecting the respective cyclic scanning light beams at two detecting positions on the photosensitive surface; and
   carrying out a time measurement for measuring for each of the respective cyclic scanning light beams a time difference between detection results at the two detecting positions,
   wherein the performing step performs the image magnification correction based on the time difference measured by the carrying step,
   wherein the scanning mechanism comprises at least one light deflecting mechanism, each comprising a plurality of light deflecting surfaces configured to move to deflect each one of the plurality of light beams emitted by the emitting step to reform it into corresponding one of the respective cyclic scanning light beams, and the executing step performs the beam detection per each of the plurality of light deflecting surfaces and the carrying step performs the time measurement per each of the plurality of light deflecting surfaces, and the performing step performs the image magnification correction based on the time measurement performed per each of the plurality of light deflecting surfaces by the carrying step, and
   wherein the carrying step performs a time measurement on a specific light deflecting surface out of the plurality of light deflecting surfaces that is regarded as a reference time measurement, and the performing step performs the image magnification correction with respect to each one of other light deflecting surfaces than the specific light deflecting surface out of the plurality of light deflecting surfaces based on a difference of a corresponding time measurement from the reference time measurement.

38. The method according to claim 37, wherein the performing step performs the image magnification correction based on a signal representing an image deviation in the main scanning direction transmitted from the image forming apparatus.

39. The method according to claim 37, wherein the performing step performs the image magnification correction based on the time difference measured by the carrying step and a signal representing an image deviation in the main scanning direction transmitted from the image forming apparatus.

40. The method according to claim 37, further comprising the step of:
   changing a frequency of the pixel clock signals in steps of a predetermined frequency value to perform the image magnification correction in collaboration with the phase change.

41. The method according to claim 40, wherein the carrying step performs a portion of the image magnification correction smaller than the predetermined frequency value.

42. The method according to claim 37, further comprising the step of:
   determining the positions, at which the phase change is performed by the performing step, randomly or evenly within an effective image area.

43. The method according to claim 42, further comprising the steps of:
   executing a beam detection for independently detecting the respective cyclic scanning light beams at two beam-detecting positions on the photosensitive surface; and
   carrying out a time measurement for measuring for each of the respective cyclic scanning light beams a time difference between detection results at the two beam-detecting positions by the executing step,
   wherein the performing step performs the image magnification correction based on the time difference measured by the carrying step, and
   wherein the determining step determines the positions, at which the phase change is performed by the performing step, randomly or evenly within an area between the two beam-detecting positions.

44. The method according to claim 43, further comprising the steps of:
   conducting a test pattern detection for detecting at two or more pattern-detecting positions a test color pattern; and
   outputting a signal representing an image deviation in the main scanning direction,
   wherein the performing step performs the image magnification correction based on the signal transmitted by the outputting step.

45. The method according to claim 44, wherein the determining step performs a position determination for determining the positions, at which the phase change is performed by the performing step, randomly or evenly within an area between the two beam-detecting positions when the performing step performs the image magnification correction based on the time difference measured by the carrying step and within an area between the pattern-detecting positions when the performing step performs the image magnification correction based on the signal transmitted by the conducting step.

46. The method according to claim 45, wherein the determining step changes the position determination per scanning line to be not aligned in the sub-scanning line.

47. The method according to claim 42, wherein the performing step performs the phase change to carry out an image position correction outside the effective image area and the image magnification correction within the effective image area, and the determining step recognizes the effective image area, determines an image forming area including the effective image area in the main scanning direction, and divides the image forming area into a first area in which the phase change is performed for the image position correction and a second area in which the phase change is performed for the image magnification correction.

48. An optical recording apparatus for use in a color image forming apparatus, comprising:
   generating means for sequentially generating a plurality of light beams corresponding to basic color elements of a full color image;
   reforming means for independently reforming the plurality of light beams emitted by the generating means into respective cyclic scanning light beams to sequentially scan in a main scanning direction a photosensitive surface moving in a sub-scanning direction;
   correcting means for performing an image magnification correction by a phase change for changing a phase of pixel clock signal in units of one nth of a cycle of the pixel clock signal at one or more positions on the photoconductive surface in the main scanning direction, n being an integer greater than one, and the pixel clock signals being used for a control of the generating means to turn on and off each of the cyclic scanning light beams in accordance with each of the basic color elements of the full color image;
   beam detection means for independently detecting the respective cyclic scanning light beams at two detecting positions on the photosensitive surface; and
   time measurement means for measuring for each of the respective cyclic scanning light beams a time difference between detection results at the two detecting positions,
   wherein the correcting means performs the image magnification correction based on the time difference measured by the time measurement means,
   wherein the reforming means comprises at least one light deflecting mechanism, each comprising a plurality of light deflecting surfaces configured to move to deflect each one of the plurality of light beams to reform it into corresponding one of the respective cyclic scanning light beams, and the beam detection means performs the beam detection per each of the plurality of light deflecting surfaces and the time measurement means performs the time measurement per each of the plurality of light deflecting surfaces, and the correcting means performs the image magnification correction based on the time measurement performed per each of the plurality of light deflecting surfaces by the time measurement means, and
   wherein the time measurement means performs a time measurement on a specific light deflecting surface out of the plurality of light deflecting surfaces that is regarded as a reference time measurement, and the correcting means performs the image magnification correction with respect to each one of other light deflecting surfaces than the specific light deflecting surface out of the plurality of light deflecting surfaces based on a difference of a corresponding time measurement from the reference time measurement.

* * * * *